United States Patent [19]

O'Dell et al.

[11] Patent Number: 4,949,246

[45] Date of Patent: Aug. 14, 1990

[54] ADAPTER FOR TRANSMISSION OF DATA WORDS OF DIFFERENT LENGTHS

[75] Inventors: Robert R. O'Dell, Cambridge; Michael A. Reiss, Lore City, both of Ohio

[73] Assignee: NCR Corporation, Dayton, Ohio

[21] Appl. No.: 210,671

[22] Filed: Jun. 23, 1988

[51] Int. Cl.[5] ............... G06F 13/00; G06F 11/22
[52] U.S. Cl. .................... 364/200; 364/900; 364/931.4; 364/927.92; 364/935.4; 364/228.5; 364/228; 364/241.9; 364/240; 364/240.5; 364/242.1; 364/242.3; 364/260; 371/15.1; 371/16.1; 371/18; 371/20.1
[58] Field of Search ... 364/200 MS File, 900 MS File; 340/825; 370/60; 371/15.1, 16.1, 18, 20

[56] References Cited

U.S. PATENT DOCUMENTS

| | | | |
|---|---|---|---|
| 4,156,907 | 5/1979 | Rawlings et al. | 364/200 |
| 4,312,066 | 1/1982 | Bantz et al. | 371/16.1 |
| 4,443,846 | 4/1984 | Adcock | 364/200 |
| 4,447,871 | 5/1984 | Terada et al. | 364/200 |
| 4,447,872 | 5/1984 | Nothaft | 364/200 |
| 4,491,916 | 1/1985 | Vallhonrat | 364/200 |
| 4,540,440 | 5/1985 | Buonomo et al. | 364/200 |
| 4,683,533 | 7/1987 | Shiozaki et al. | 364/200 |
| 4,683,534 | 7/1987 | Tietjen et al. | 364/200 |
| 4,725,949 | 2/1988 | Dreher | 364/405 |
| 4,752,928 | 6/1988 | Chapman et al. | 371/20 |
| 4,779,190 | 10/1988 | O'Dell et al. | 364/200 |
| 4,823,343 | 4/1989 | Takahashi | 371/16.1 |
| 4,837,682 | 6/1989 | Culler | 364/200 |
| 4,839,895 | 6/1989 | Makita | 371/16.1 |
| 4,843,557 | 6/1989 | Ina et al. | 364/431.77 |
| 4,870,638 | 9/1989 | Kawano et al. | 370/13 |

OTHER PUBLICATIONS

U.S. Patent Application Ser. No. 937,638, filed Dec. 3, 1986, Robert R. O'Dell et al., entitled "Communication Bus Interface".

*Primary Examiner*—Michael R. Fleming
*Assistant Examiner*—Gopal C. Ray
*Attorney, Agent, or Firm*—Wilbert Hawk, Jr.; Albert L. Sessler, Jr.; Richard W. Lavin

[57] ABSTRACT

An apparatus for controlling the transfer of data between a first remote processor constructed to process data words of a first length and a second remote processor constructed to process data words of a second length and which includes a storage member constructed to store data words of a third length. A DMA controller controls the transmission of data words between the storage member and the first remote processor. A first control processor controls the operation of a second processor and the DMA controller for transferring data from the second remote processor to the storage member. In response to instructions transmitted from the second remote processor, the first control processor will enable the second control processor to transfer data words of a third length to the storage member and will enable the DMA controller to transfer data words of the second length from the storage member to the second remote processor. Logic circuit means under the control of the first control processor enables either the first or second control processor or the DMA controller access to the storage member for performing a read or write operation on the storage member.

11 Claims, 20 Drawing Sheets

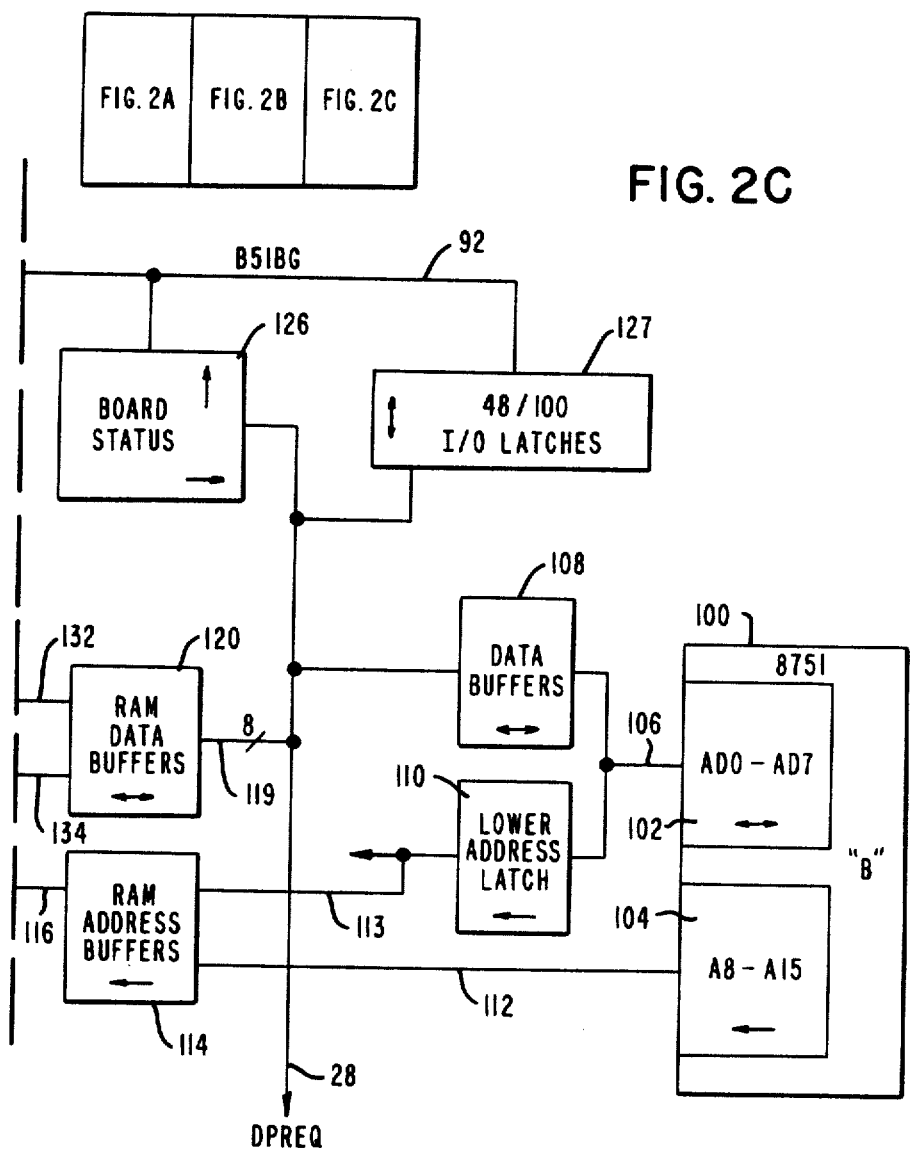

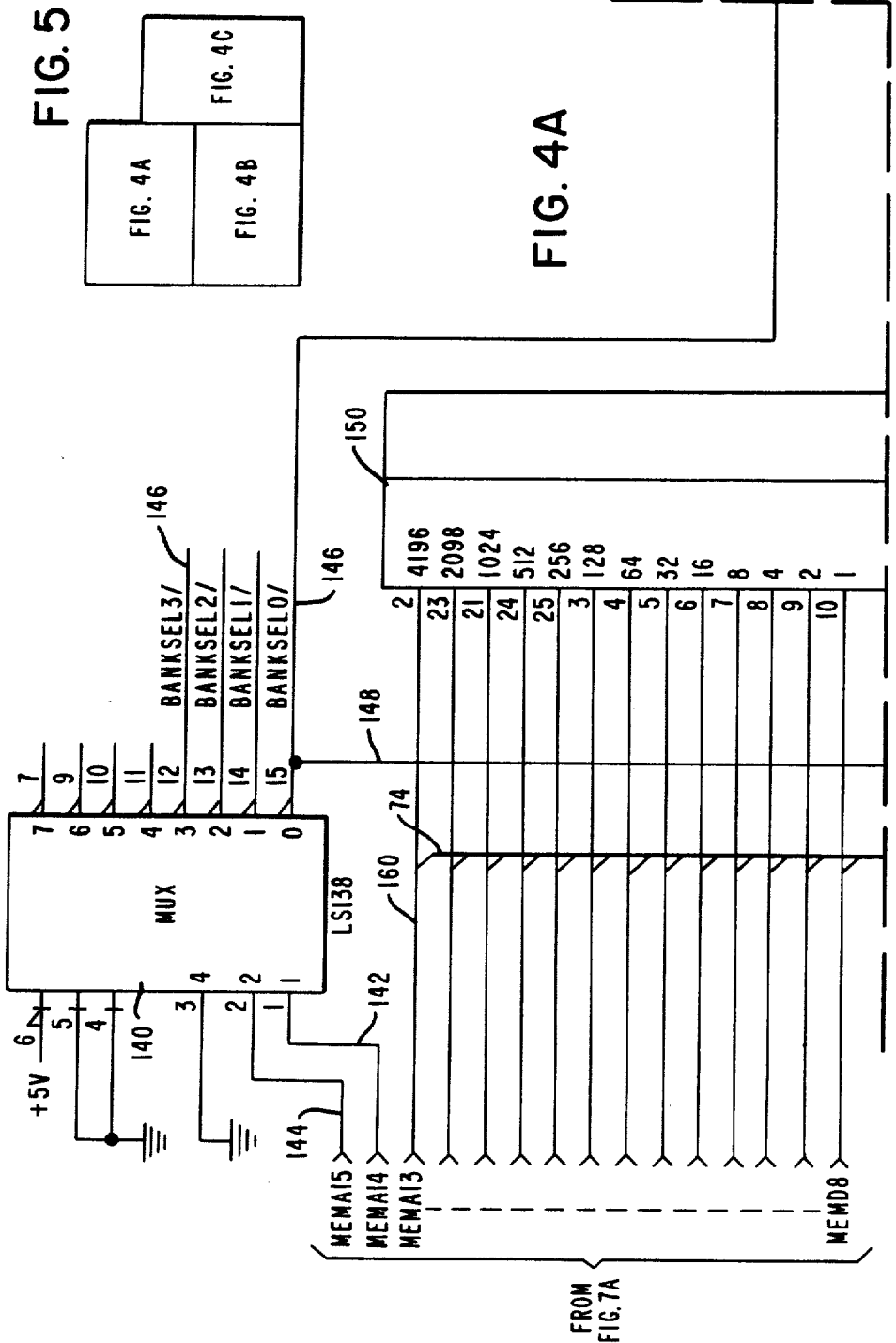

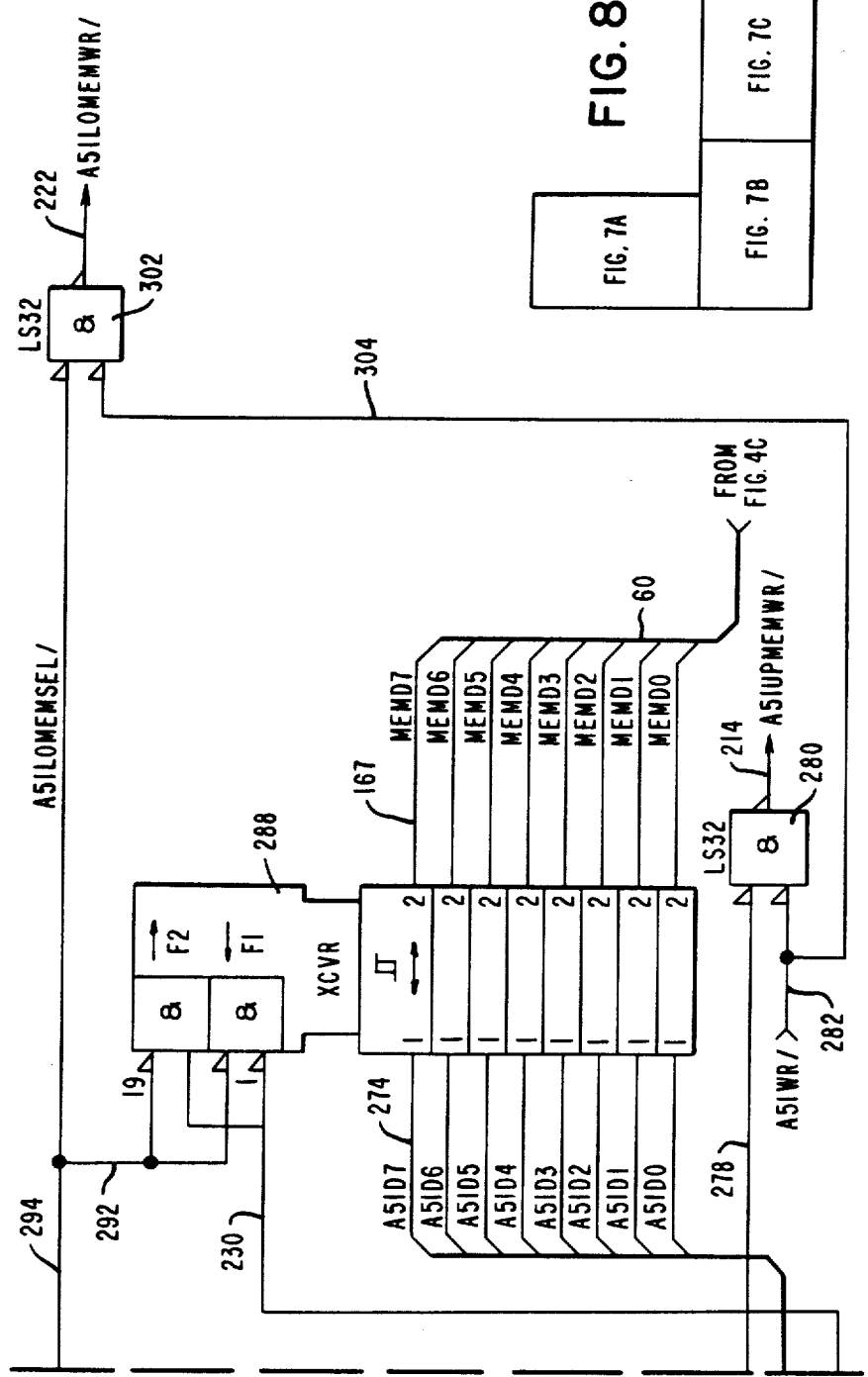

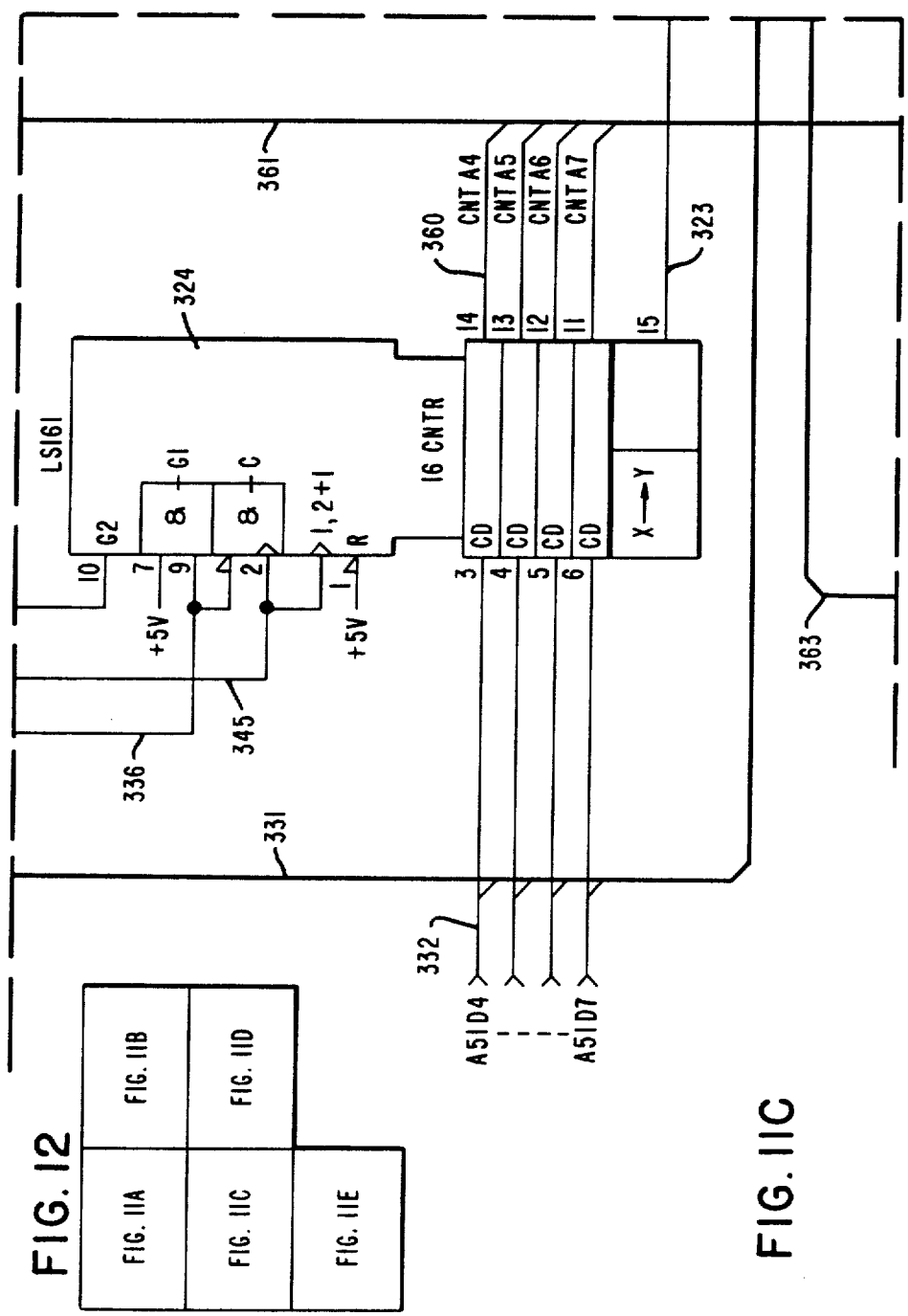

ADAPTER FOR TRANSMISSION OF DATA WORDS OF DIFFERENT LENGTHS

BACKGROUND OF THE INVENTION

The present invention relates to a data collection system in which data outputted over a communication channel from a data terminal device is collected and stored for examination as part of a test procedure and more particularly relates to a interface for transmitting data from a source to a storage device having different transmission characteristics.

In testing the performance characteristics of a data terminal device, data outputted from the terminal device is transmitted over a communication channel to a data test device which alters the data to facilitate the examination as part of a test procedure and which stores the altered data for use in the test procedure at a later date. Prior test systems utilize magnetic tape as a storage medium. Since present data terminal devices are operating at very high speeds, it was found that the magnetic tape medium could not store the data outputted from the test device because of the high speed throughput of the data from the test device. It was decided to store the data on a hard disc file over a communication bus having different transmission characteristics from those of the communication bus over which data from the test device is transmitted.

It is therefore a principal object of this invention to provide a low-cost communication interface adapter which enables the transmission of data between a source of data characters and a storage device, each constructed to operate on communication channels having different transmission characteristics.

It is a further object of this invention to provide a communication interface adapter which is capable of transferring data between two different bus configurations at a high rate of speed.

SUMMARY OF THE INVENTION

These and other objects of the present invention are realized by providing an interface adapter unit for coupling a data collector to a data transmission system. The system includes a remote hard disc file in which the data collector transmits data for storage on the disc file to be used in verifying the data outputted by a data terminal device. The interface adapter unit includes first and second control processors and a DMA controller. The first control processor controls the transmission of data from the data collector for storage in a pair of RAM memory units. The second control processor controls the DMA controller enabling the controller to transfer the data from the RAM memory units to a data processor. The data processor transfers the data to the hard disc file for storage therein. The second control processor will set up the DMA controller to take control of the primary bus that connects the interface adapter with the data processor. The DMA controller will access the RAM memory to obtain the required data. The first control processor accesses the RAM memory units on an eight-bit bus. In a similar manner, the second control processor accesses the RAM memory units on eight-bit buses. The DMA controller unit transfers the data from the RAM memory unit over a sixteen-bit bus. The interface adapter unit includes status and control register circuits enabling the second control processor to monitor the transfer operation that is occurring between the data collector and the interface adapter.

BRIEF DESCRIPTION OF THE DRAWINGS

Additional advantages and features of the present invention will become apparent and fully understood from a reading of the following description taken together with the accompanying drawings in which:

FIGS. 2A-2C, inclusive, taken together, disclose a block diagram of the interface adapter unit of the present invention;

FIG. 3 is a diagram showing the manner in which FIGS. 2A-2C, inclusive, are arranged with respect to each other to form the block diagram;

FIGS. 4A-4C, inclusive, taken together, disclose a detailed logic diagram of the RAM memory units;

FIG. 5 is a diagram showing the manner in which FIGS. 4A-4C, inclusive, are arranged with respect to each other to form the logic diagram;

FIGS. 7A-7C, inclusive, taken together, disclose a detailed logic diagram of the memory address and data buffers associated with the control processor 48;

FIG. 8 is a diagram showing the manner in which FIGS. 7A-7C, inclusive, are arranged with respect to each other to form the logic diagram;

FIG. 10 is a diagram showing the manner in which FIGS. 9A and 9B are arranged with respect to each other to form the logic diagram;

FIGS. 11A-11E, inclusive, taken together, disclose a detailed logic diagram of the DMA RAM address counter buffer;

FIG. 12 is a diagram showing the manner in which FIGS. 11A-11E, inclusive, are arranged with respect to each other to form the logic diagram.

DESCRIPTION OF THE PREFERRED EMBODIMENT

Figure 1:
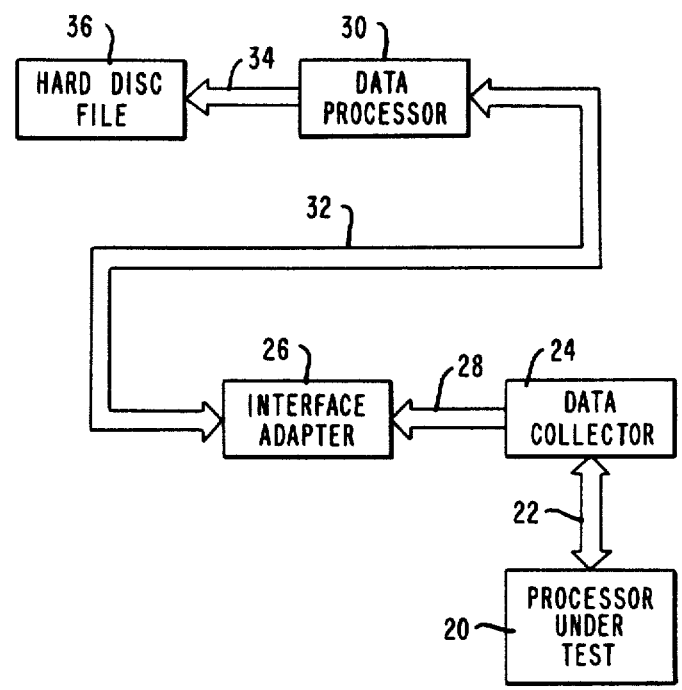
FIG. 1 is a block diagram of the data collecting system which includes the interface adapter unit of the present invention.

Referring now to FIG. 1, there is shown a block diagram of the data collection system of the present invention in which the interface adapter unit of the present invention is incorporated. The data collection system includes a data processor 20 under test such as a data terminal device which outputs binary data at a very high rate of speed. The processor 20 is coupled over bus 22 to a data collector 24 which collects the binary data outputted from the processor 20. In the past, the data collector 24 has transmitted the data received from the processor 20 to a magnetic tape storage unit for storage thereon enabling the data to be examined at a later date. With the advent of high speed data terminal devices, it was found that the tape storage unit could not store the data at the rate outputted by the data collector. In order to overcome this problem, the data collector was coupled to a high speed data processor 30 whose throughput could accommodate the data outputted by the data collector. The data processor 30 is coupled to a hard disc file 36 which stores the data transmitted from the processor 30 over bus 34. The data collector 24 outputs four-bit data words, while the data processor 30 processes sixteen-bit data words. In order to transfer the data words outputted from the data collector 24 to the processor 30, the interface adapter unit of the present invention 26 is coupled over a four-bit data bus 28 to the data collector 24 and over a sixteen-bit data bus 32 to the data processor 30. The interface adapter unit 26 enables the data to be transmitted between the data collector 24 and the processor 30 at a high rate of speed allowing the data collector to process the data received from the data processor 20 under test over bus 22.

Figure 2A:
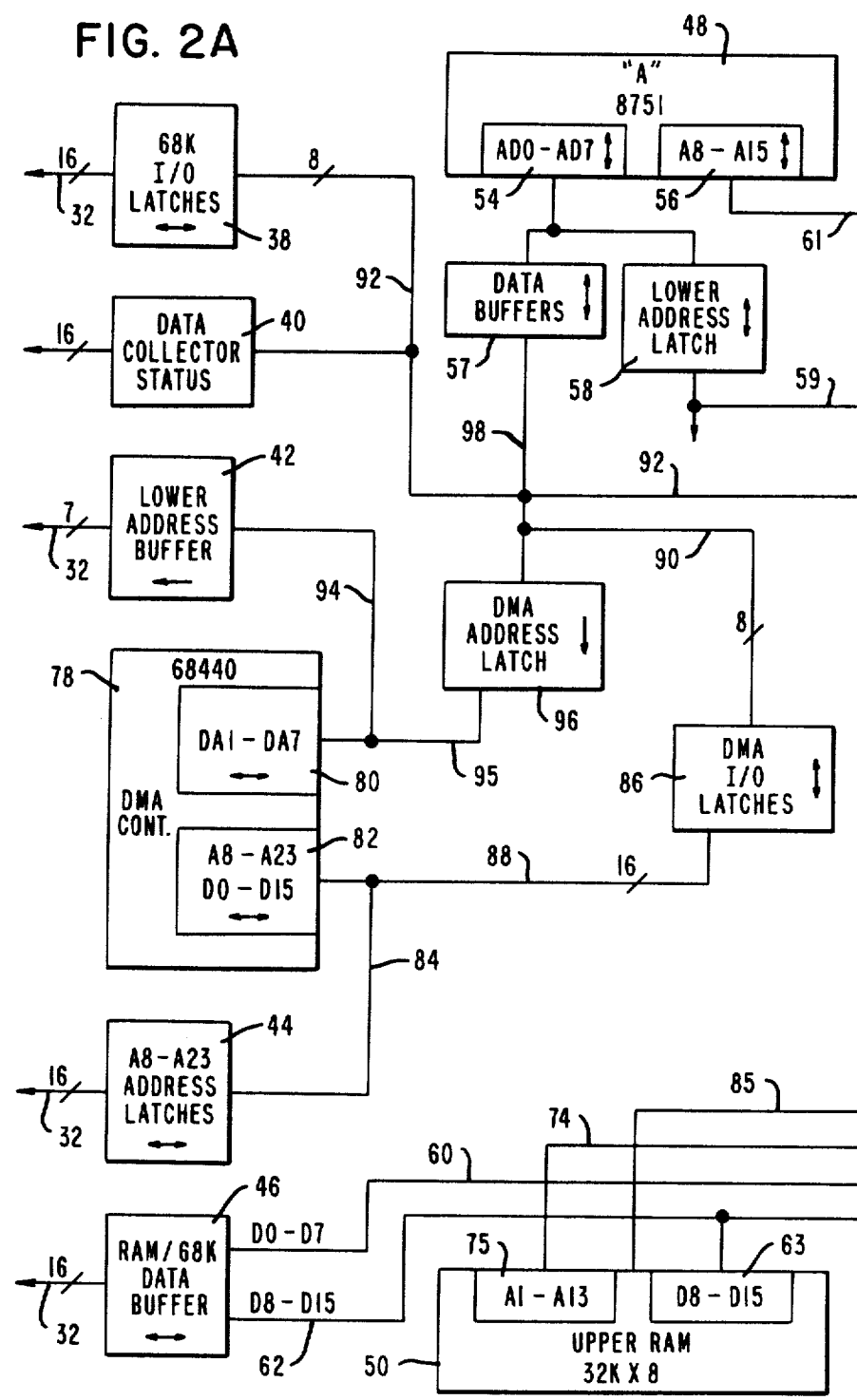
Figure 2B:
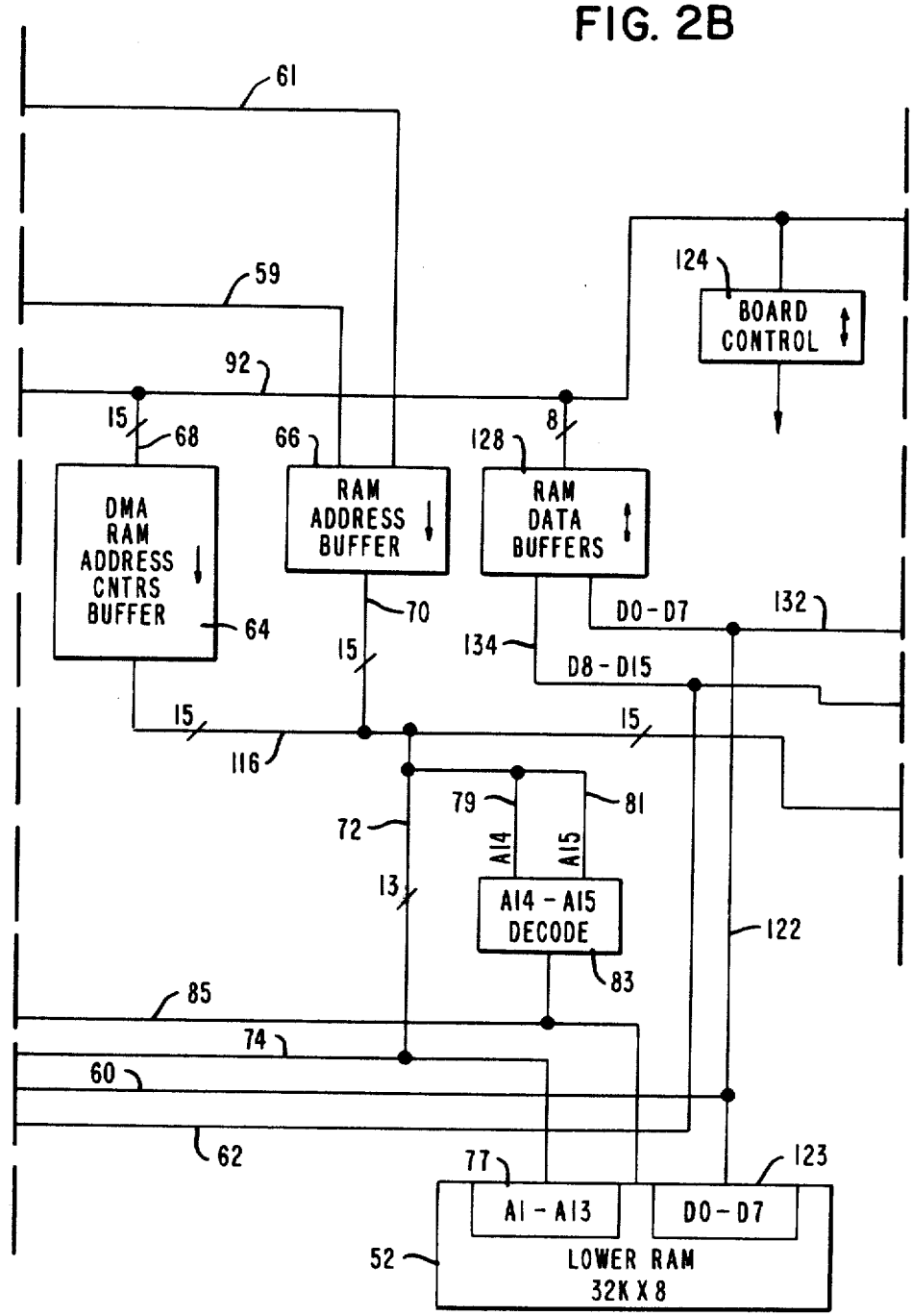

Referring now to FIGS. 2A–2C inclusive, there is disclosed a block diagram of the interface adapter 26 unit (FIG. 1). As shown in FIG. 2A, the interface adapter unit includes I/O latches unit 38, which store eight-bit data words for transmission over the sixteen-bit bus 32 to the data processor 30 (FIG. 1). The latches unit 38 also stores data from the processor 30 pertaining to the address in the processor's memory where data, transferred from the adapter 26, is to be stored. In response to storing data from the processor 30, the latches unit will generate an interrupt signal 68KINT/ to a processor 48 (FIG. 2A) for enabling the processor to read the data stored. Also included in the interface adapter is a status register unit 40 in which is stored data pertaining to the operating status of the data collector 24, a lower address buffer 42, a high address latches unit 44 and a data buffer 46, all of which are associated with a DMA (direct memory access) controller 78 and are coupled over the sixteen-bit bus 32 to the processor 30. As will be described more fully hereinafter, the DMA controller 78 controls the transfer of data from the interface adapter unit 26 to the processor 30.

The interface adapter unit 26 further includes the bus controller or processor 48 (FIG. 2A) for controlling the transfer of data from the data collector 24 (FIG. 1) to the interface adapter unit 26. The bus controller 48 may comprise an INTEL 8751 microprocessor which is commercially available from the Intel Corporation of Santa Clara, Calif. The data that is to be transferred to the processor 30 is stored in an eight-bit upper RAM memory unit 50 (FIG. 2A) and a eight-bit lower RAM memory unit 52 (FIG. 2B). The processor 48 includes a lower address/data port 54 which time shares address-/data bits AD0-AD7 for storage in the processor 48 and also for the outputting of such data bits to the adapter unit 26 enabling the operation of control elements found therein. The processor 48 also includes an upper address port 56 which outputs the upper eight-bits of the address used in accessing data in the memory units 50 and 52. The lower port 54 is connected to a data buffers unit 57 in which data pertaining to the operation of a DMA controller 78 is transmitted from the processor 48 to an input-output DMA latches unit 86 for transmission to the DMA controller 78. Data transmitted through the latches unit 38 and any other data that is transmitted between the processor 48 and the adapter unit 26 utilizes the data buffers unit 57. A lower address latch 58 coupled to the lower address port 54 receives address data bits from the processor 48 enabling various control elements in the interface adapter unit to operate in a manner to be described hereinafter.

Data stored in the RAM memory units 50 and 52 are outputted over buses 60 and 62 through the data buffer 46 for transmission over bus 32 to the processor 30. This transfer operation is under the control of the DMA controller 78 as will be described more fully hereinafter. The controller 78 will start transferring data from the RAM memory units 50 and 52 starting at an address outputted by the processor 48. These address bits are transmitted from the processor 48 through a DMA RAM address counter buffer 64 (FIG. 2B) which generates a plurality of addresses used in removing the data from the memory units 50 and 52 and a RAM address buffer 66 (FIG. 2B). These signals are transmitted over the 15-bit buses 70 and 116, the 13-bit bus 72 and the bus 74 to the RAM memory units 50 (FIG. 2A) and 52 (FIG. 2B).

The controller 78 (FIG. 2A) may comprise a Motorola 68440 DMA controller, which is commercially available from the Motorola Corporation of Phoenix, Ariz. The DMA controller 78 includes a lower address output port 80 which inputs/outputs lower address bits DA1-DA7 inclusive and an address/data port 82 which inputs/outputs address bits A8-A23 and data bits D0-D15 inclusive. The processor 30 transmits to the processor 48 through the latches unit 38 the address at which the data, outputted by the adapter 26, is to be stored in the memory located in the processor 30. In response to receiving this address, the processor 48 will transmit the address to the controller 78 through a DMA address latch 96 to the port 80 and data through a DMA I/0 latches unit 86 (FIG. 2A) to the port 82. The address/data port 82 is coupled over bus 84 to the address latches unit 44 for transmission of the upper address bits A8-A23 inclusive over bus 32 to the memory in the data processor 30 for controlling the storing of the data outputted over bus 32. The lower address output port 80 of the controller 78 is coupled over bus 94 to the lower address buffer 42 and over bus 95 to the DMA address latch 96. Address bits transmitted over bus 98 from the processor 48 will be latched in the address latch 96 for transmission to the port 80 in the DMA controller 78.

The interface adapter unit 26 further includes a processor 100 (FIG. 2C) which may comprise an INTEL 8751 microprocessor for controlling the transfer of data from the data collector 24 (FIG. 1) to the RAM storage units 50 and 52. The processor 100 includes an address-/data port 102 which outputs the lower address/data bits AD0-AD7 inclusive of the data stored in the processor 100 and also functions as an input/output data port and an address port 104 which outputs the upper address bits A8-A15 inclusive. The port 102 is coupled over the bus 106 to a data buffers unit 108 and an lower address latch 110. Four-bit data words appearing on the bus 28 from the data collector 24 (FIG. 1) are transmitted through the data buffers unit 108 for storage in the processor 100. The processor 100 combines two four-bit data words stored in the processor 100 and outputs the resulting eight-bit words over the eight-bit bus 119 to a RAM data buffers unit 120 from which the data is transmitted over buses 132 and 122 (FIG. 2B) to the lower RAM memory unit 52.

Further included in the interface adapter unit 26 is a board mode control read/write register unit 124 (FIG. 2B), containing data for use in controlling the operation of various elements on the interface adapter unit and a board status read only register unit 126 (FIG. 2C) in which is stored data signals representing the operating status of the various elements in the interface adapter unit 26 and used by the processor 48 in controlling the operation of the adapter unit 26. Eight bit data words transmitted over bus 92 between the microprocessor 48

(FIG. 2A) and the RAM memory units 50 (FIG. 2A) and 52 (FIG. 2B), are transmitted through a RAM data buffer unit 128 (FIG. 2B). The lower eight data bits D0–D7 inclusive are transmitted through the buffer unit 128 and over buses 132 and 122 to the data port 123 in the lower RAM memory unit 52. The upper eight data bits D8–D15 inclusive are transmitted through buffer unit 128 and over buses 134 and 62 to the data port 63 in the upper RAM memory unit 50. Data transmitted between the processor 48 and the processor 100 are temporarily stored in the I/O latches unit 127 (FIG. 2C). The processor 100 is enabled by the signal B51BG/ transmitted by the processor 48 over bus 92 (FIG. 2C) and through the latches unit 127 to the processor 100.

Figure 4B:
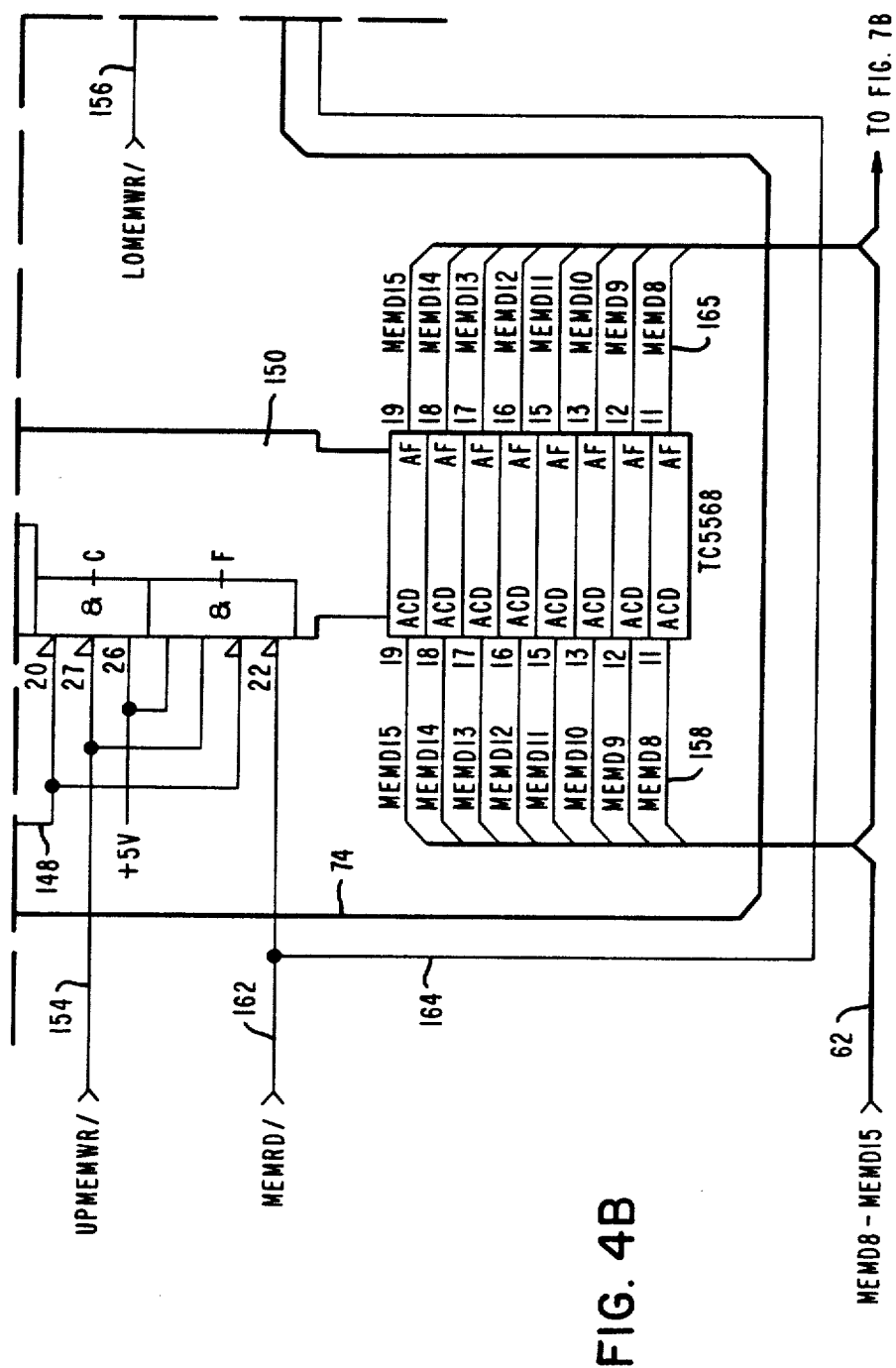
Figure 4C:
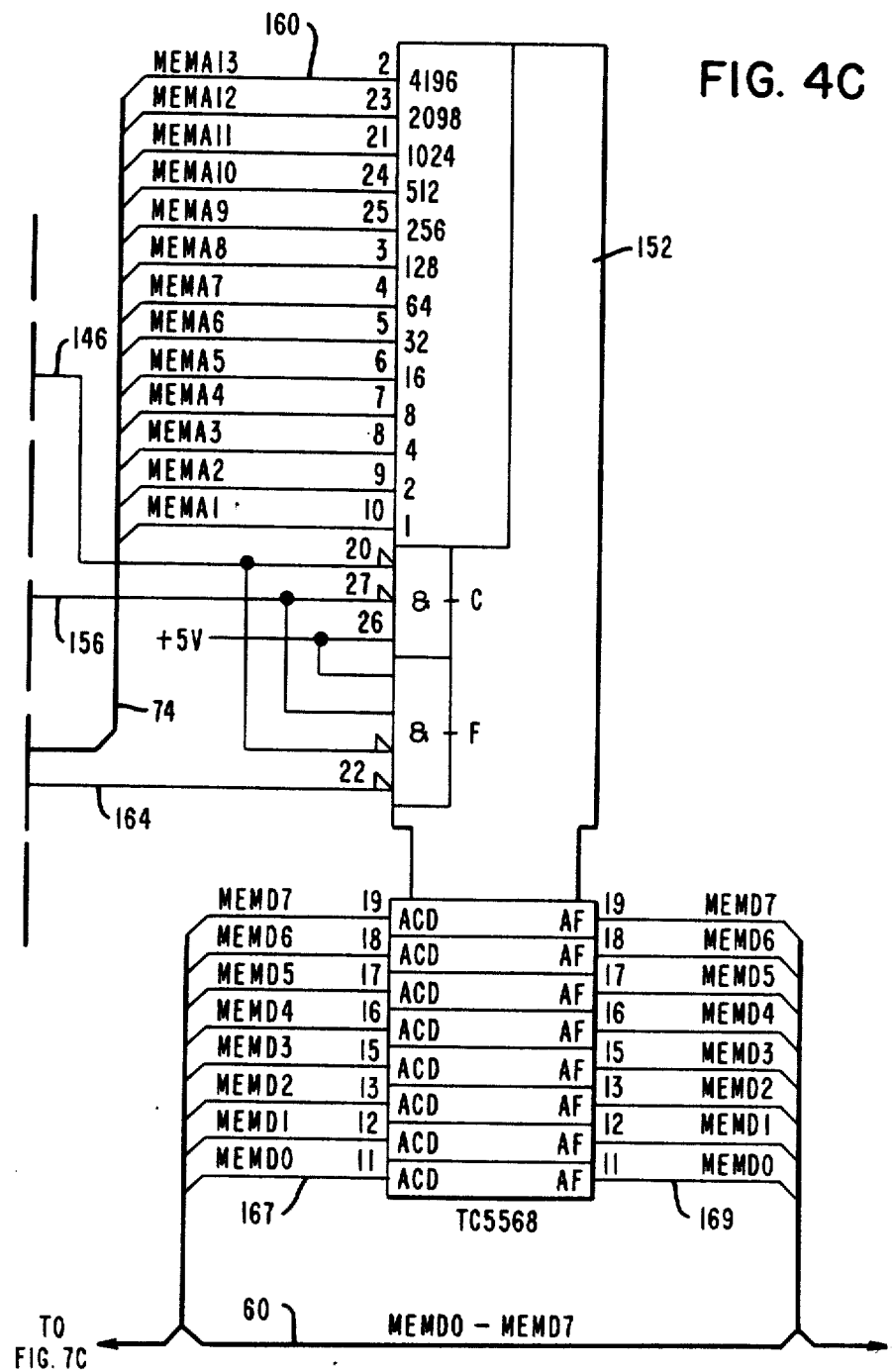

Referring now to FIGS. 4A–4C, inclusive, there is disclosed a portion of the upper and lower RAM memory units 50 (FIG. 2A) and 52 (FIG. 2B). Since the memory units comprise a number of the same type of memory integrated circuit chips, only two of the chips will be shown and described. Included in the memory units is a LS138 multiplexer 140 (FIG. 4A) which receives over lines 142 and 144 of the bus 85 (FIG. 2B) the memory address data bits MEMA14 and MEMA15 transmitted from the A14–A15 decode unit 83 (FIG. 2B) which in turn receives the address bits from the processor 48 (FIG. 2A) for accessing the memory units 50 and 52.

The multiplexer 140 will output over its output lines 146 the memory bank select signals BANKSEL0/–3/ inclusive for selecting the memory chip in which eight bit data words are to be stored or to be retrieved. The upper memory chip 150 shown in FIGS. 4A and 4B and the lower memory chip 152 shown in FIG. 4C are Toshiba TC 5565 RAM memory chips which are commercially available from the Toshiba Corporation of Santa Clara, Calif. The signal BANKSEL0 is transmitted over line 146 to the lower memory chip 152 (FIG. 4C) and over line 148 to the upper memory chip 150 (FIGS. 4A and 4B) enabling the chips for an access operation. Appearing on the input line 154 (FIG. 4B) to the upper memory chip 150 and transmitted from the processor 48 is the upper memory write signal UPMEMWR/ which enables the upper eight data bits MEMD8–MEMD15 inclusive appearing on the input port 63 (FIG. 2A) of the memory unit 50, to be written over lines 158 (FIG. 4B) into the upper memory chip 150 at an address represented by the address bits MEMA1–A13 inclusive (FIG. 4A). These address bits appear at the input port 75 (FIG. 2A) of the memory unit 50 on the input lines 160 of bus 74. In a similar manner, the lower memory chip 152 (FIG. 4C) will have the eight data bits MEMD0–D7 inclusive appearing on the input lines 167 (FIG. 4C), written into the memory chip in response to the lower memory write signal LOMEMWR/ (FIG. 4B) appearing on its input line 156 in a manner that is well known in the art. When data is to be read from the memory chips 150 and 152, the memory read signal MEMRD/ will appear on the input line 162 (FIG. 4B) which is transmitted to the memory chip 150 and over line 164 to the memory chip 152 (FIG. 4C) resulting in the eight memory data bits MEMD8–D15 inclusive being outputted over lines 165 of bus 62 (FIG. 4B) and the eight memory data bits MEMD0–D7 inclusive (FIG. 4C), appearing on the input lines 167 of chip 152 being outputted over lines 169 of the bus 60 (FIG. 2B) for transmission to the data buffer 46 (FIG. 2A) which outputs the sixteen data bits D0–D15 inclusive over the bus 32 to the processor 30.

Figure 6:
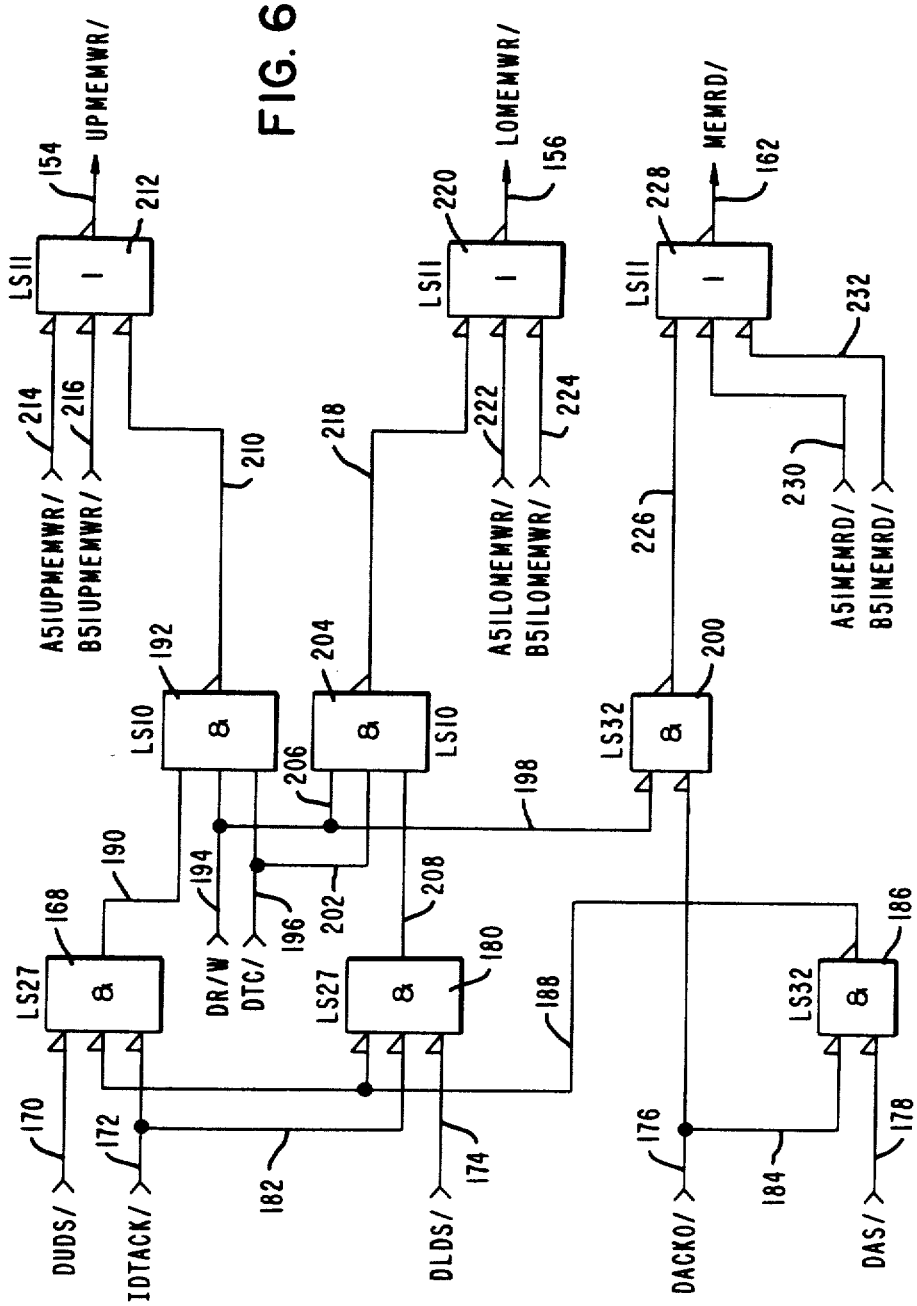
FIG. 6 is a detailed logic diagram of the memory read/write timing circuits.

Referring now to FIG. 6, there is shown a memory read/write timing logic circuit for controlling the accessing of the upper and lower memory units 50 and 52 by either of the processors 48 and 100 or the DMA controller 78 (FIGS. 2A–2C, inclusive). Included in the timing circuit is a LS27 three input AND gate 168 which receives over the input line 170 the upper data strobe signal DUDS/ from the DMA controller 78. The gate 168 also receives over the input line 172 the data acknowledge signal IDTACK/ from the processor 30 (FIG. 1) indicating that the processor 30 has received the data bits transmitted from the interface adapter unit 26 under the control of the DMA controller 78. The DMA controller unit 78 will also output the lower data strobe signals DLDS/ over input lines 174, the data acknowledge address strobe DACK0/ over input line 176 and the data address strobe DAS/ over input line 178 which are used in accessing the memory units 50 and 52 (FIGS. 2A and 2B). The lower address strobe signal DLDS/ will be inputted into a LS27 three input AND gate 180 which also receives over input line 182 the data acknowledge signal IDTACK/ (FIG. 6).

The signal DACK0/ appearing on input line 176 indicates that the DMA controller unit 78 has gained control of the bus 32 for transferring data to the processor 30 (FIG. 1). This signal is transmitted over line 184 to one input of an LS32 two input NAND gate 186 which also receives the address strobe signal DAS/ over input line 178. The NAND gate 186 will output over line 188 a low signal which is inputted into the AND gates 168 and 180. The AND gate 168 will output a high signal over the output line 190 which is inputted into a LS10 three input NAND gate 192. The gate 192 also receives over input lines 194 the read/write signal DR/W and over input line 196 the data transfer complete timing signal DTC/ from the DMA controller 78. The signal DTC/ goes active low at the completion of the transfer of a data word from the memory units 50 and 52 to the processor 30. The signal DR/W is also transmitted over line 198 to one input of an LS32 two input NAND gate 200 which also receives over input line 176 the data acknowledge address strobe signal DACK0/.

The timing signal DTC/ appearing on line 196 is transmitted over line 202 to one input of a LS103 input NAND gate 204 which also receives over line 206 the read/write signal DR/W and over line 208 the output signal of the AND gate 180. The NAND gate 192 in response to receiving a high signal appearing on its input lines will output a low signal over its output line 210 which is inputted into an LS11 three input NOR gate 212. The NOR gate 212 receives on its input line 214 the upper memory write signal A51UPMEMWR/ from the processor 48 and over line 216 the upper memory write signal B51UPMEMWR/ from the processor 100 (FIG. 2C) when either of the processors is requesting to write data into the memory unit 50 (FIG. 2A). Depending on the level of the signals inputted into the NOR gate 212, the active low upper memory write signal UPMEMWR/ will appear on its output line 154 (FIG. 4B) for transmission to the upper memory chip 150 (FIG. 4B) for controlling which of the processor units 148, 100 or the DMA controller 78 will gain access to the memory chips.

In a similar manner, the NAND gate 204 will output over line 218 a signal to an LS11 three input NOR gate 220 which also receives over the input line 222 from the processor 48 (FIG. 2A) the lower memory write signal A51LMEMWR/ and over input line 224 from the processor 100 (FIG. 2C) the lower memory write signal B51LOMENWR/. Depending on the level of the input signals, the NOR gate 220 will output over line 156 (FIG. 4C) the lower memory write signal LOWMENWR/ to the lower memory chip 152 (FIG. 4C) enabling either the processor 48, the processor 100 or the DMA control unit 78 to gain access to the memory chip for performing a write operation. The NAND gate 200 will output over line 226 a high signal to an LS11 three input NOR gate 228 which also receives over its input line 230 the active low memory read signal A51MEMRD/ from the processor 48 and over its input line 232 the active low memory read signal B51MEMRD/ from the processor 100. The occurrence of any one of these signals will enable the NOR gate 228 to output the active low memory read signal MEMRD/ over its output line 162 (FIG. 4B) to the memory chips 150 and 152 enabling a read operation of the chips to occur. It will be seen from this arrangement that only one of the processors 48, 100 or the DMA controller unit 78 will be given access to the memory units 50 and 52 without the inadvertent interference from the other two operating units. As previously described, the processor 48 controls which unit is given access to the memory units 50 and 52.

Figure 7A:
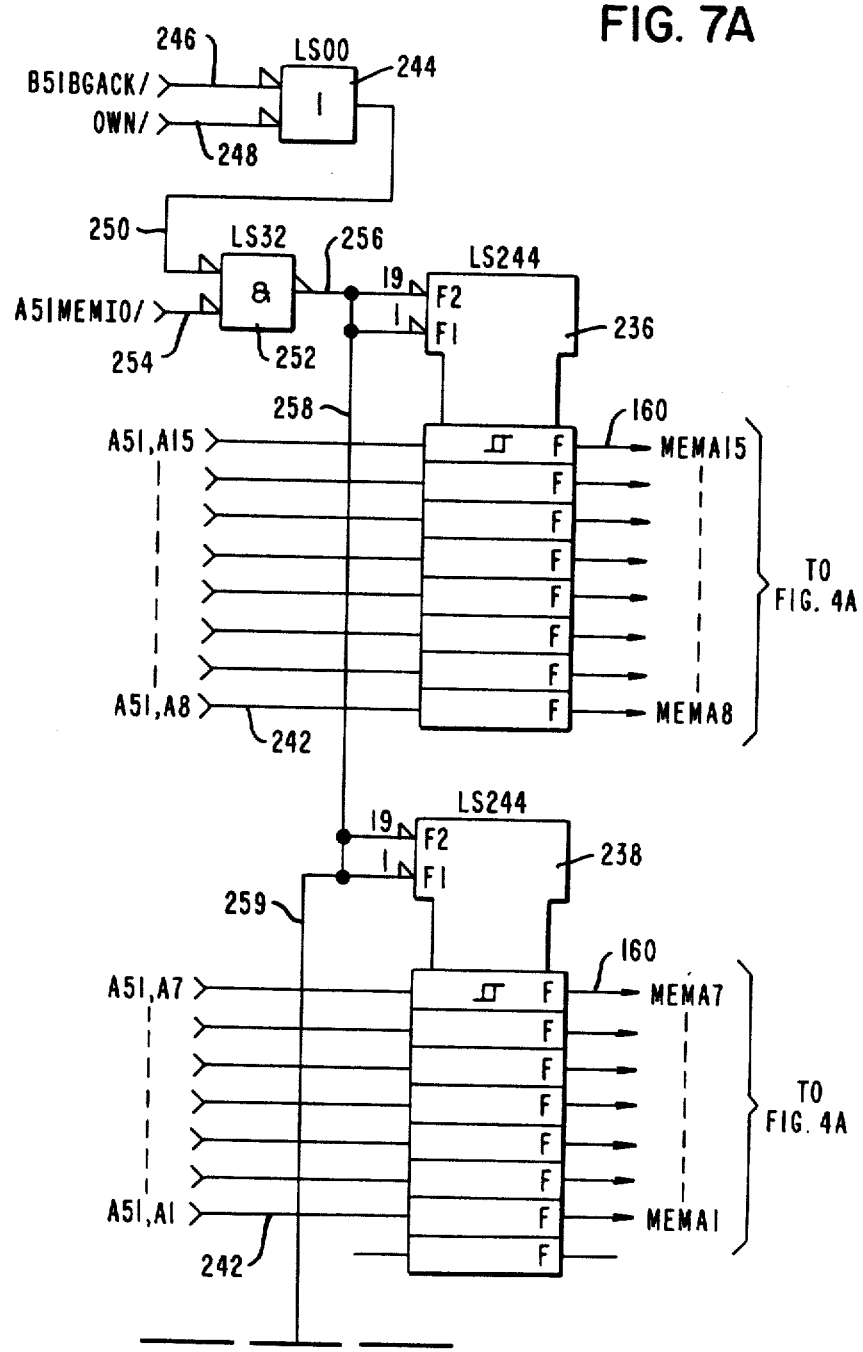
Figure 7B:
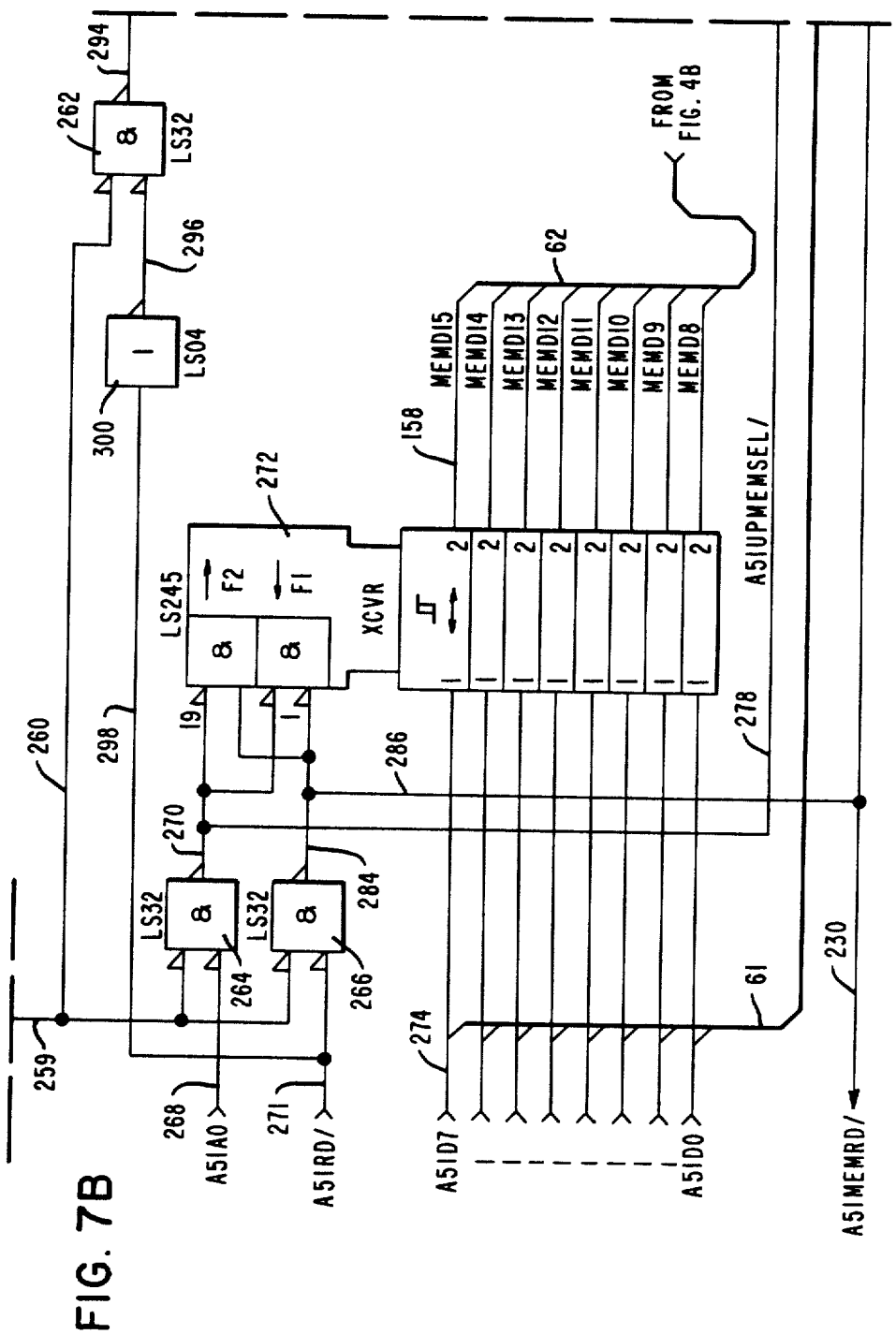

Referring now to FIGS. 7A-7C, inclusive, there are shown logic circuits associated with the processor 48 (FIG. 2C) for transferring data to the memory units 50 (FIG. 2A) and 52 (FIG. 2B). A similar circuit is associated with the processor 100 (FIG. 2C). As shown in FIG. 7A, the RAM address buffer unit 66 (FIG. 2B) includes the LS244 buffers 236 and 238 which drive the memory address lines 160 (FIGS. 4A and 4C) in response to the address bits A5A1-A15 inclusive appearing on input lines 242 and which are outputted from the processor 48 through the ports 54 and 56 (FIG. 2A) for use by the processor 48 in accessing the memory units 50 and 52. An OR gate 244 (FIG. 7A) receives over line 246 the bus grant acknowledge signal B51BGACK/ which is transmitted from the processor 100 (FIG. 2C) when the processor gains control of the bus 122 to transfer data to the memory units 50 and 52, and over line 248 the control signal OWN/ from the DMA controller 78 (FIG. 2A). The signal B51BGACK/ is generated by the processor 100 in response to receiving the bus grant signal B51BG (FIG. 2C) over bus 92 from the processor 48 awarding control of the bus 122 to the processor 100. The signal OWN/ indicates that the controller 78 has gained control of the bus 32 from the processor 30. The input signals to the OR gate 244 indicate that either the DMA controller 78 or the processor 100 has gained access to the memory units 50 and 52. Once access to the memory units has been given to either the controller 78 or the processor 100, the buffers 236 and 238 will be disabled from accepting address data bits from the processor 48 by the generation of the signals B51BGACK/and OWN/. The output signal of the OR gate 244 will appear on line 250 which is inputted into one input of a LS32 NAND gate 252 which receives on its other input line 254 the memory request signal A51MEMIO/ transmitted from the processor 48. Depending on the level of the signals inputted into the OR gate 244 and the NAND gate 252, the NAND gate 252 will output over lines 256 and 258 to the buffers 236 and 238 signals enabling the buffers 236 and 238 to drive the address signals appearing on their input lines 242 over the output lines 160 to the memory units 50 and 52.

The signal appearing on line 258 is also transmitted over lines 259 and 260 (FIG. 7B) to one input of an LS32 NAND gate 262 and also to one input of the LS32 NAND gates 264 and 266 (FIG. 7B). The NAND gate 264 will receive over input line 268 the address control signal A51A0 from the processor 48 while the NAND gate 266 receives over input line 271 the read request signal A51RD/ from the processor 48 requesting access to the memory units 50 and 52 so as to perform a read operation. The NAND gate 264 will output the upper memory select signal A51UPMEMSEL/ over line 270 to the LS274 buffer 272 which receives on its eight-bit input lines 274 the data bits A51D0-D7 inclusive, allowing the buffer to drive on its output lines 158 the memory data bits MEMD8-D15 inclusive which are part of the bus 62 (FIG. 4B) for input into or out of the upper memory chip 150 (FIG. 4B). The signal A51UPMEMSEL/ is also inputted over line 278 to a LS32 NAND gate 280 (FIG. 7C). The gate 280, in response to receiving a write signal A51WR/ over its other input line 282 from the processor 48 enables the gate 282 to output the upper memory write signal A51UPMEMWR/ over line 214 to the upper memory chip 150 (FIG. 4B) for initiating a write operation.

The NAND gate 266 (FIG. 7B) will output a memory read signal A51MEMRD/ over line 284 to the buffer 272 and over lines 286, 230 to the buffer 288 (FIG. 7C) and to the memory control circuits (FIG. 6). The buffer 288 will drive the data signals A51D0-D7 inclusive appearing on its input lines 274 of bus 60 over the output lines 167 as the memory data bits MEND0-D7 inclusive to the lower memory chip 152 (FIG. 4C) during a write operation. During a read operation, data is transmitted over lines 274 to the RAM/68K data buffer 46 (FIG. 2A). The buffer 288 (FIG. 7C) receives over its input lines 292 the memory select signal A51LOMEMSEL/ from the NAND gate 262 (FIG. 7B) which in turn receives on its input line 296 the active low read signal A51RD/ transmitted from the processor 48 over lines 271, 298 and through the inverter 300. This low memory select signal A51LOMENSEL1 is transmitted to one input of an LS32 NAND gate 302 (FIG. 7C) which also receives the write signal A51WR/ from the processor 48 over the input line 304. The NAND gate 302 in response to receiving these control signals will output the low memory write signal A51LOMENWR/ over line 222 to the memory select control circuits (FIG. 6) for enabling a write operation by the processor 48 to occur in the lower memory chip 152 (FIG. 2B).

Figure 9A:
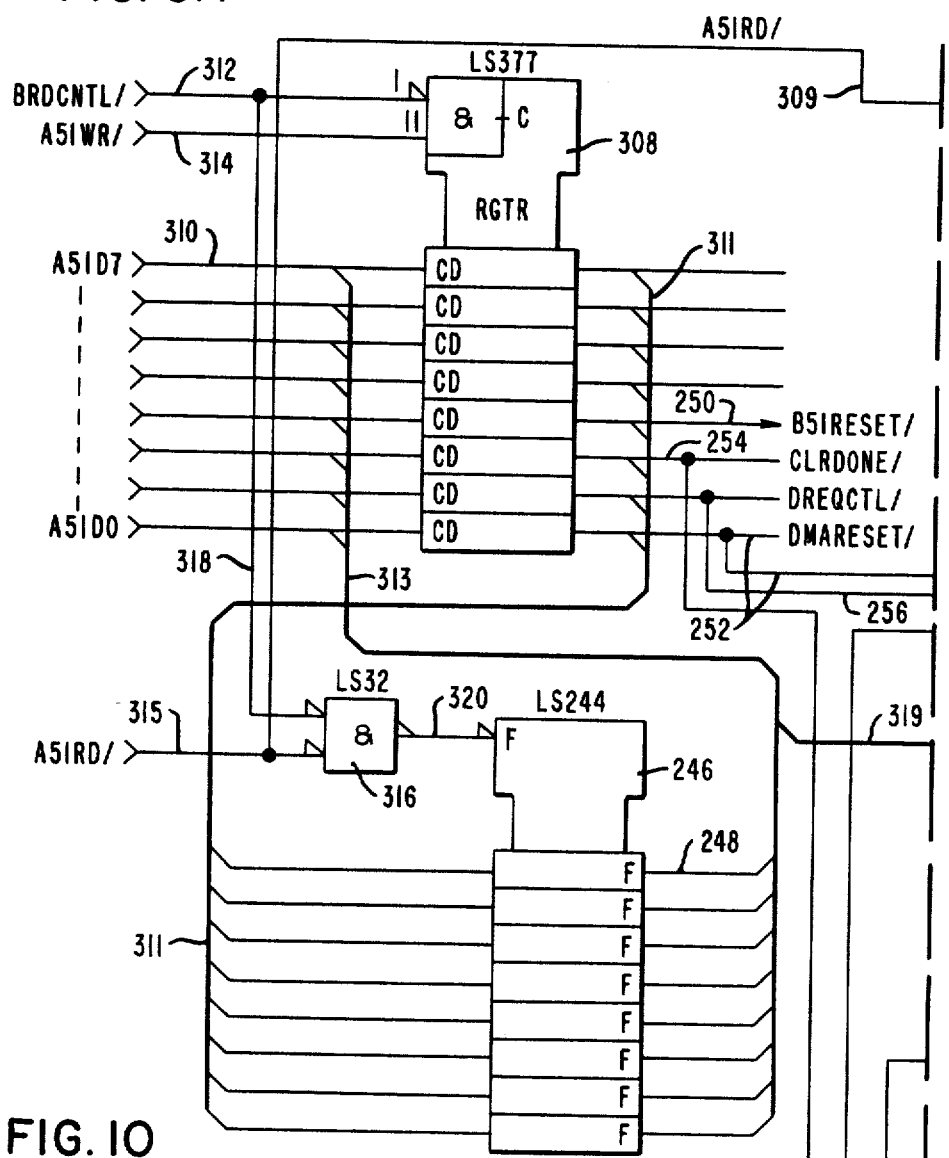
FIGS. 9A and 9B, taken together, disclose a detailed logic diagram of the board control register unit and the board status register unit.
Figure 10:
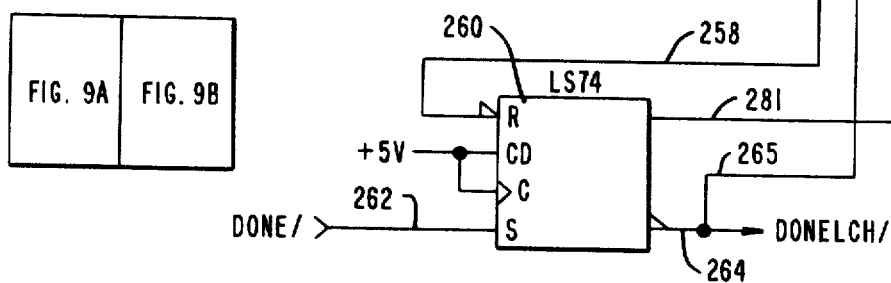
Figure 9B:
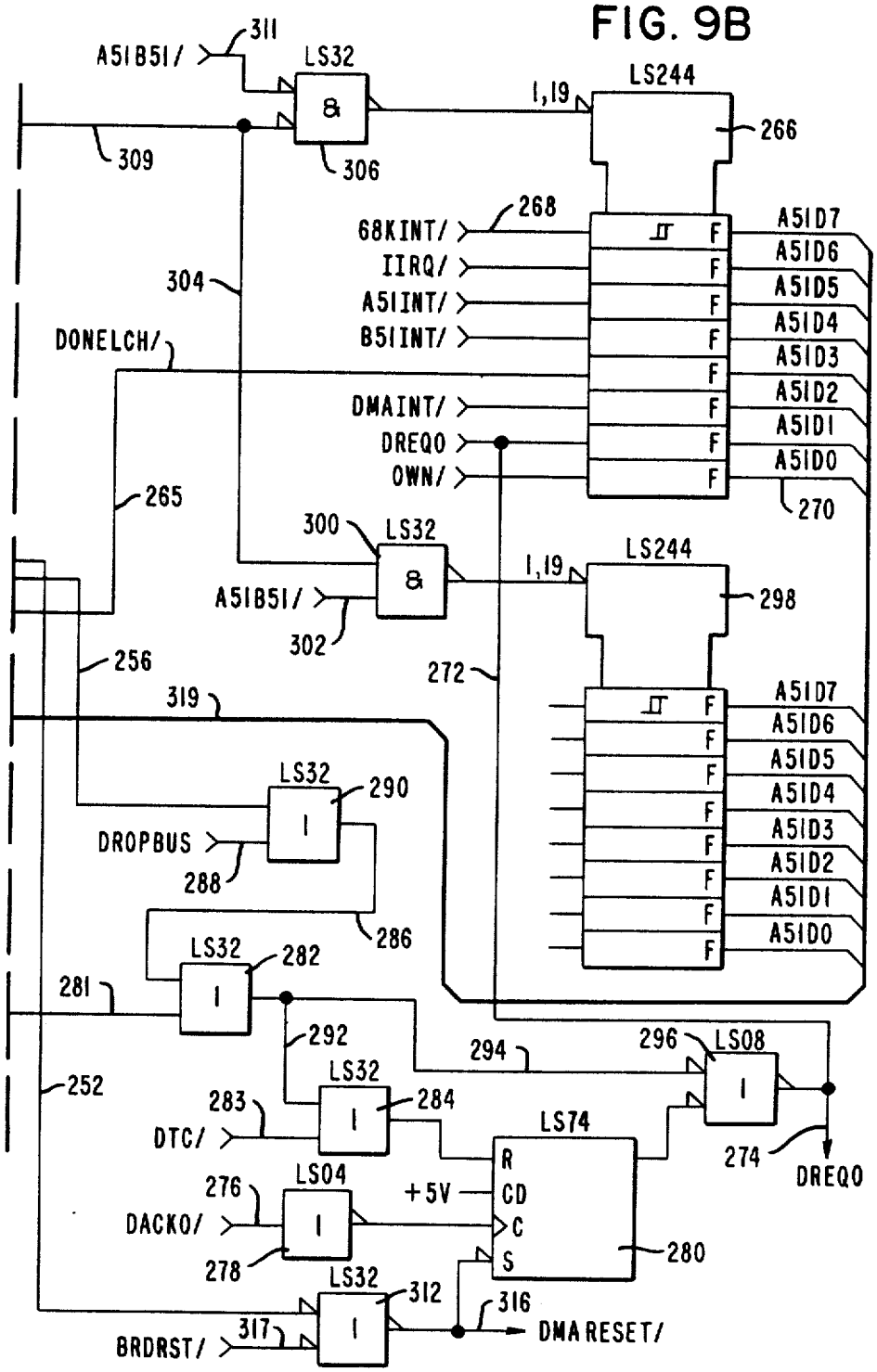

Referring now to FIGS. 9A and 9B inclusive, there is shown the circuitry included in the board control register unit 124 (FIG. 2B) and the board status register unit 126 (FIG. 2C). The board control unit 124 (FIG. 9A) includes a 74LS377 read/write register 308 for storing data bits A51D0-A51D7 inclusive transmitted from the control processor 48 and appearing on input lines 310 of the bus 130 (FIGS. 2A and 2B). When the control processor 48 generates control signals to be used in controlling the operation of the interface adapter unit 26, the signals will appear as data bits A51D0-A51D7 inclusive on the input lines 310 enabling register 308 to output control signals to the specific control element in the adapter unit 26. The processor 48, in addressing the control register unit 124, will output the board control signal BRDCNTL/ over line 312 to the register 308 which also receives over its input line 314 the write signals A51WR/ from the processor 48. These signals will enable the register 308 to store the data bits appearing on input lines 310. When the data bits are to be read from the register 308, the processor 48 will output the read signal A51RD/ over line 315 to one input of a NAND gate 316 which also receives the board control signal BRDCNTL/ over input line 318. The NAND gate 316 will output a control signal over line 320 to an LS244 buffer 246 enabling the buffer to output the data bits stored in the register 308 over lines 248.

Appearing on the output lines 250 and 252 of the register 308, are the reset signals B51RESET/ transmitted to the processor 100 (FIG. 2C) and the reset signal DMARESET/ transmitted over line 252 to the DMA controller 78 (FIG. 2A) enabling the processor 48 to send data to each of these units without the danger of the two units not being ready to receive the data. Appearing on the output line 254 of the register 308 is the clear done signal CLRDONE/ while on the output line 256 is the data request control signal DREQCTL/. The signal DREQCTL/ is made active low by the processor 48 to tell the DMA controller 78 to request control of the processor bus 32. If the processor 100 requests access to the memory units 50 and 52 at this time, the processor 48 can remove the signal CLRDONE, thereby disabling the controller 78 from obtaining control of the bus 32 and allowing the processor 100 access to the memory units. The clear done signal CLRDONE/ is also transmitted over line 258 to reset an LS74 flip-flop 260 which receives the signal DONE/ from the DMA controller 78 on the set input line 262. This latter signal notifies the processor 48 that the DMA transfer operation is completed. Resetting of the flip-flop 260 will output the control signal DONELCH/ over the output line 264 which is transmitted to the board status unit 126 (FIG. 2C) and to a LS244 buffer 266 (FIG. 9B) over line 265.

The buffer 266 also receives on its input lines 268 the following interrupt signals: 68KINT/ from the latches unit 38 requesting that the processor 48 read the data stored in the latching unit 38 which has been received from the processor 48 requesting transfer of data from the data collector 24; A51INT/ from the processor 48; B51INT from the processor 100 when the processor is requesting access to the memory units 50 and 52 and the interrupt signal DMAINT/ from the DMA controller 78. The buffer 266 also receives over lines 268 the control signals IIR0/ from the processor 30 and DONELCH/, DREQ0/ and OWN/ from the controller 78 which are outputted over lines 270 as the data bits A51-D0–D7 inclusive. These signals allow the control processor 48 (FIG. 2A) to control the transfer of data to the processor 30 and to monitor the activities of the DMA controller 78 (FIG. 2A) and the processor 100 (FIG. 2C). When the DMA controller 78 has gained control of the bus 32 to transfer data from the memory units 50 and 52 to the processor 30, the controller will output the active low signal OWN/ over line 268 to the buffer 266.

The processor 48 (FIG. 2A) will generate a data request signal DREQ0/ over lines 268, 272 and 274 (FIG. 9B) to the DMA controller 78 when the processor wants the controller to gain control of the bus 32 for a data transfer operation. When the DMA controller 78 has gained control of the bus 32, the DMA controller will also output the acknowledgment signal DACK0/ over 276 (FIG. 9B) which is inverted by the inverter 278 and clocks the flip-flop 280. The flip-flop 280 is reset by a signal derived from the flip-flop 260 (FIG. 9A) whose output signal is transmitted over line 281, through an OR gate 282 and an OR gate 284. The OR gate 282 receives on its input line 286, the data request control signal DREQCTL/ from the register 308 (FIG. 9A) which is outputted over line 286 through the OR gate 290 (FIG. 9B). The OR gate 290 also receives the active high drop bus signal DROPBUS over line 288 from the DMA controller 78 at the conclusion of a data transfer operation. The output signal of the OR gate 282 is also transmitted over line 294 to the OR gate 296 which receives on its other input line the output signal of the flip-flop 280. The gate 296 outputs the data request signal DREQ0/ over line 274 to the DMA controller 78.

The board status unit 126 (FIG. 2C) also includes a buffer 298 (FIG. 9B), which is operated by a signal from the NAND gate 300, which receives the control signal A51B51/ over input line 302 and the read signal A51RD/ over input line 304 from the processor 48. In a similar manner, the buffer 266 is operated by a signal from the NAND gate 306 which receives on its input line 309 the read signal A51RD/ and the control signal A51B51/ on line 311 from the processor 48. The flip-flop 280 (FIG. 9B) is set by a signal derived from the DMA reset signal DMARESET/ appearing on line 316 which is inputted through the NOR gate 312. The NOR gate also receives on its input line 317, the board reset signal BRDRST/ from the processor 48.

Figure 11A:
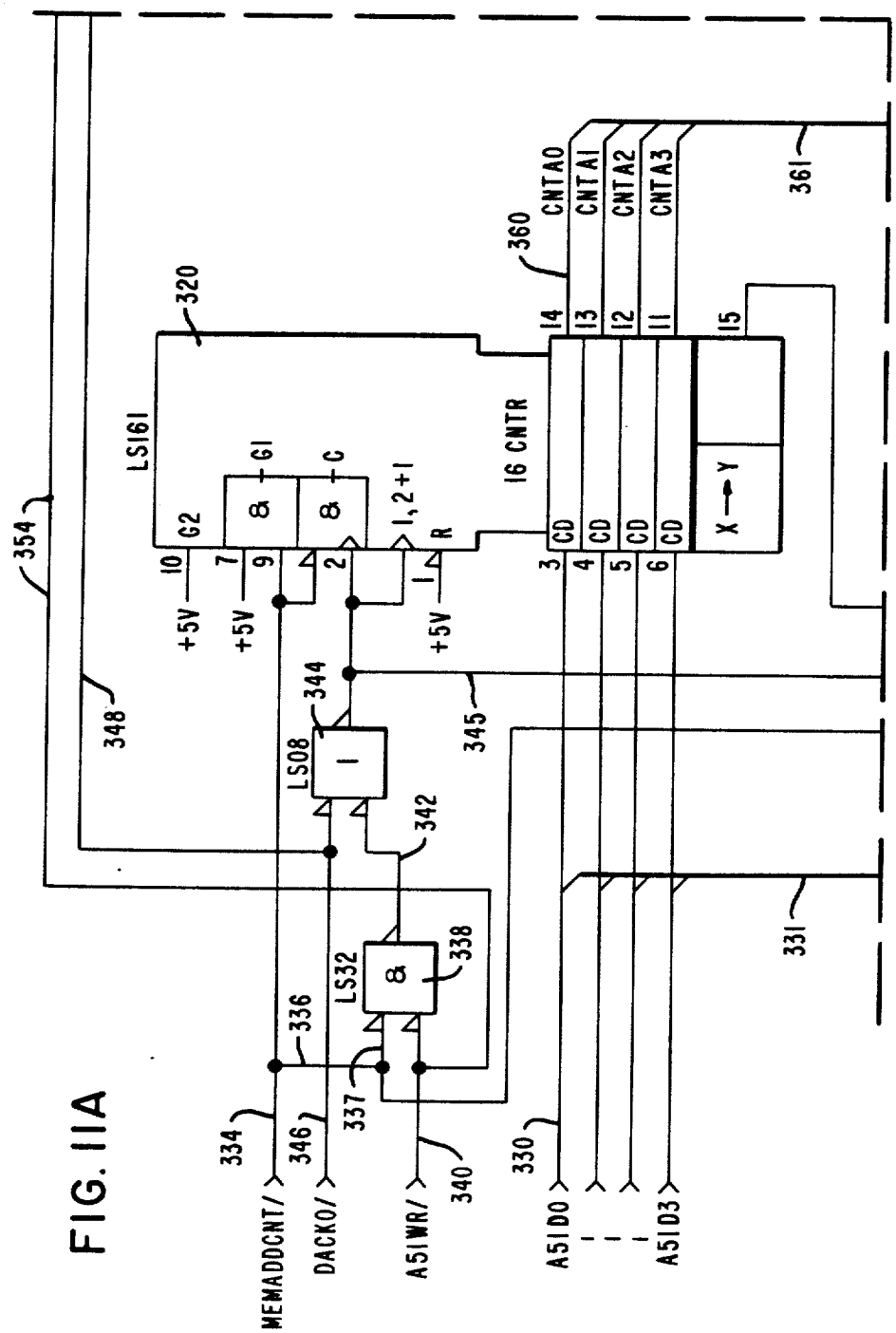
Figure 11B:
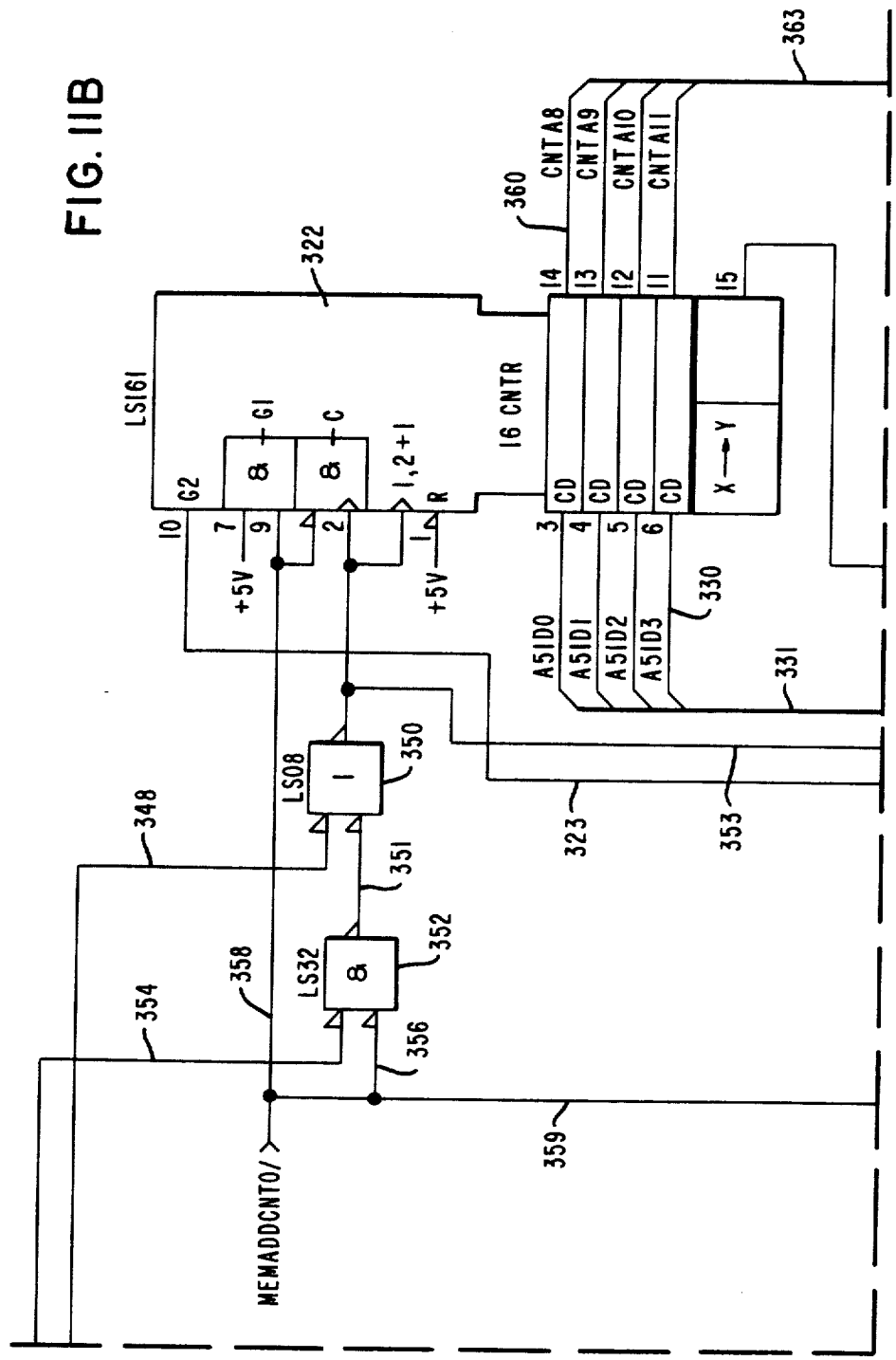
Figure 11D:
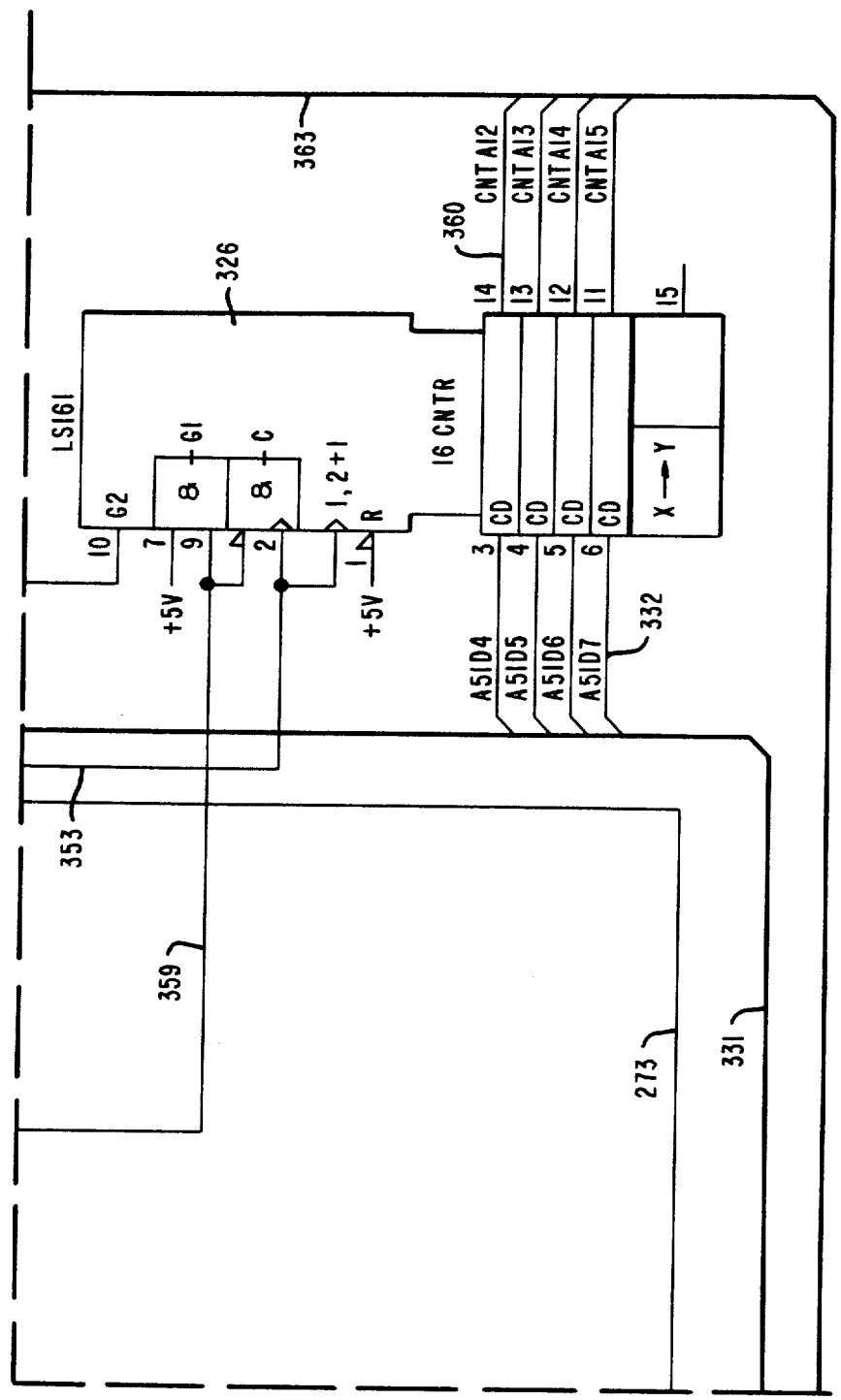
Figure 11E:
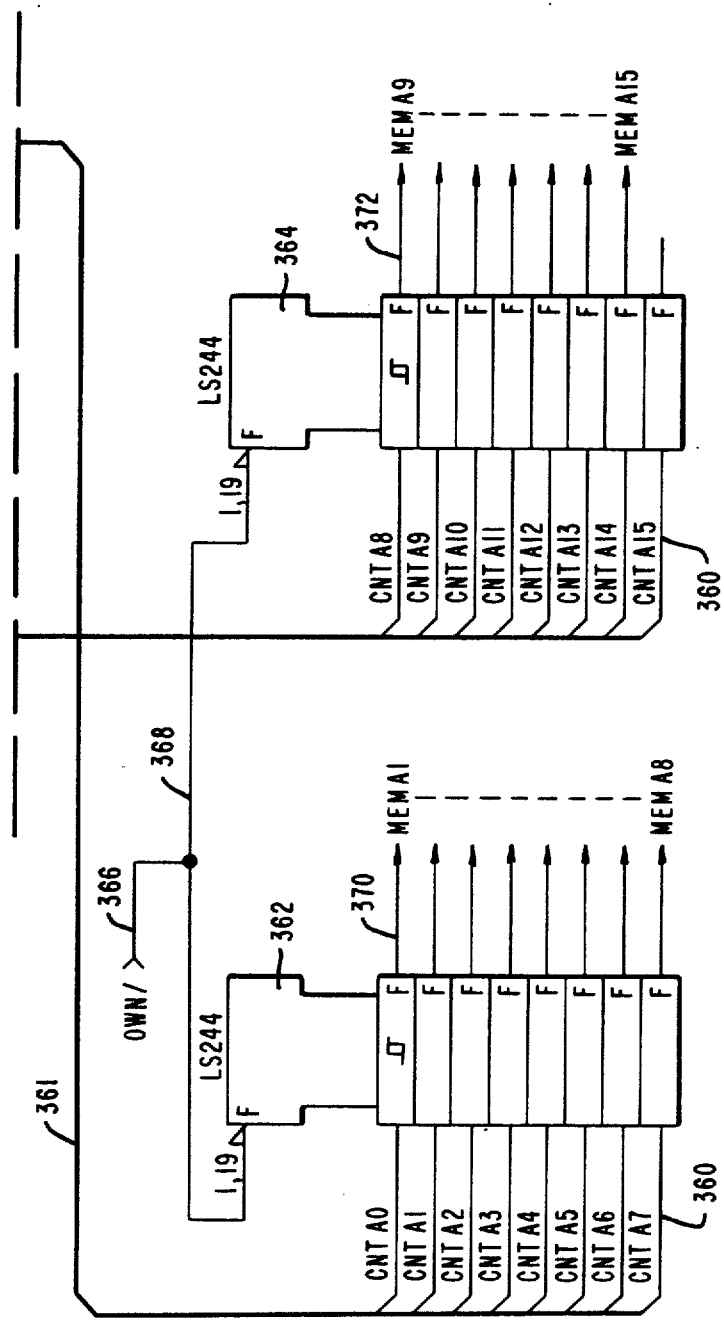

Referring now to FIGS. 11A–11E inclusive, there are shown the address counters and buffers located in the DMA RAM address counter buffer 64 (FIG. 1) for generating addresses to the RAM memory units 50 and 52 when the DMA controller 78 (FIG. 1) is transferring data over the processor bus 32. Included in the counters are four-bit LS161 counters 320–326, inclusive (FIGS. 11A–11D inclusive) in which the counters 324 and 326 (FIGS. 11C and 11D) receive over their input lines 332 of bus 68 (FIG. 2B) the data bits A51D4–D7 inclusive from the processor 48. The counters 320 and 324 (FIGS. 11A and 11C) receive over the input lines 330 of bus 68 and the internal bus 331 the data bits A51D0–D3 inclusive. These counters are enabled by the memory address counter signal MEMADDCNT1/ from the processor 48 appearing on input lines 334 and 336 (FIG. 11A and 11C). The signal MEMADDCNT1/ is also transmitted over lines 336 and 337 to one input of an LS32 NAND gate 338 which also receives on its other input line 340, the write signal A51WR/ from the processor 48 enabling the processor to load the starting address in the counters of the data to be transferred. The output signal of the NAND gate 338 is transmitted over line 342 to one input of an LS08 NOR gate 344. The NOR gate 344 receives on its other input line 346 the acknowledge signal DACK0/ from the DMA controller 78 (FIG. 2A) which indicates the control of the bus 32 by the controller enabling a data transfer operation to occur. This signal is also transmitted over line 348 to the NOR gate 350 (FIG. 11B) whose output signal is transmitted to the counter 322, clocking the counter. The signal DACK0/ goes high after a transfer of data by the controller 78 to the processor 30 has occurred, which signal clocks the counter 322, to output the address of the next data word that is to be transferred. The NOR gate 350 receives on its other input line 351 a signal outputted from the LS32 NAND gate 352 which in turn receives on its input line 354 the write signal A51WR/ from the processor 48 (FIG. 1) and on its other input line 356 the memory address counter signal MEMADDCNT0/ which is also transmitted over line 358 to the counter 322 (FIG. 11B). The memory address counter signals MEMADDCNT1/ appearing on line 334 (FIG. 11A) and MEMADDCNT0/ appearing on input line 358 are also transmitted over line 336 to the counter 324 (FIG. 11C) and over line 359 to the counter 326 (FIG. 11D), enabling the counters to be clocked in a manner similar to that of the counter 322. The counters 324 and 326 are also operated by the output signal of the NOR gates 344 (FIG. 11A) and 350 (FIG. 11B). The output signal of NOR gate 344 is transmitted over line 345 to counter 324 and the output signal of NOR gate 350 is transmitted over line 353 to the counter 326. Each of the counters 320-326 inclusive will output over lines 360 a four-bit word forming the sixteen-bit word CNTA0-16 inclusive. The four-bit words outputted by the counters 320 and 324 (FIG. 11A and 11C) are inputted over bus 361 into a LS244 buffer 362 (FIG. 11E) while the four-bit words outputted by the counter 322 and 326 (FIGS. 11B and 11B) are inputted over bus 363 into the LS244 buffer 364 (FIG. 11E). Each of the buffers 362 and 364 are enabled by the signal OWN/ which is transmitted over lines 366 and 368 to the buffers 362 and 364. When this occurs, the memory address signals MEMA1-8 inclusive will be outputted over lines 370 from the buffer 362 and the memory address signals MEMA9-A15 inclusive will be outputted over lines 372 from the buffer 364 to the memory units 50 and 52 (FIG. 2A and 2B) for enabling the DMA controller 78 to transfer data from the RAM memory units 50 and 52 to the processor 30 over the processor bus 32.

Figure 13A:
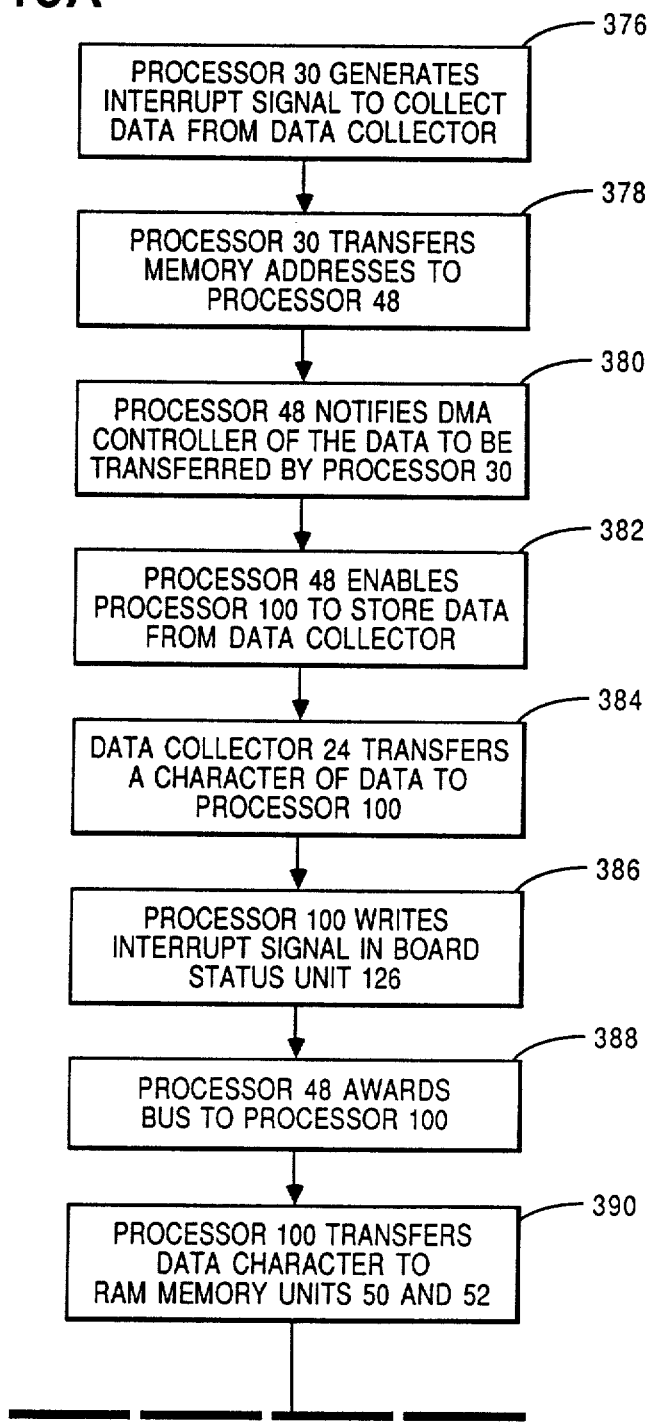
FIG. 13A and 13B, taken together, constitute a flow chart of the operation of the interface adapter unit during a data transfer operation.
Figure 13B:
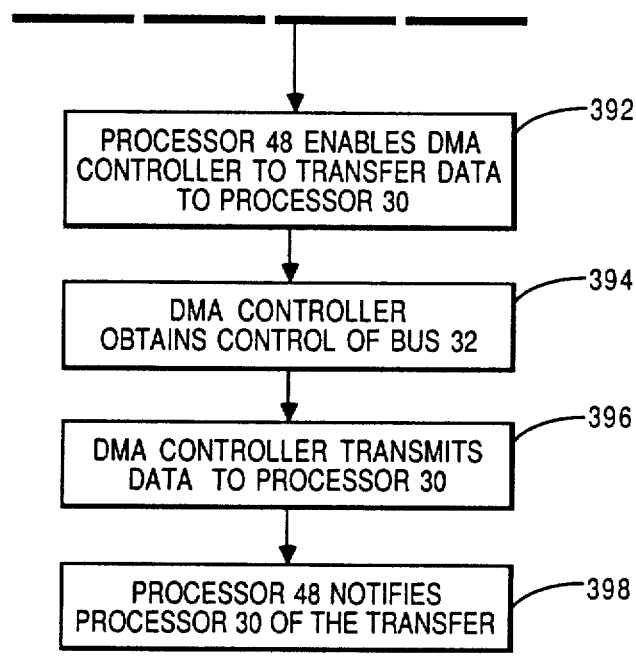

Referring now to FIG. 13A and 13B, there is shown a flow chart of an operation of the interface adapter of the present invention. The processor 30 will initiate the data collection operation by storing data in the latches unit 38 which raises the interrupt signal 68KINT (block 376) to the processor 48 requesting that data be transferred from the data collector 24 to the memory in the processor 30. The processor 30 will also transmit address data to the processor 48 through the latches unit 40 representing the location in the memory of the processor 30 where the data is to be stored (block 378) and the number of data words to be transferred which data is transferred to the DMA controller (block 380). The processor 48 will enable the processor 100 to store four bit data words transmitted from the data collector 24 in the processor 100 (block 382). When the data collector 24 (FIG. 1) has data to be transferred to the data processor 30, the collector will generate over bus 28 the interrupt signal DPREQ/ to the processor 100 (FIG. 2C) and load the data buffers 108 (block 384) with a four bit word of data that is to be transferred. In response to the interrupt signal generated by the data collector 24, the processor 100 generates the interrupt signal B51INT for storage in the board status unit 126 (FIG. 2B) (block 386) requesting control of the internal buses 122 and 62. In response to the storage of the interrupt signal in the status unit 126, the processor 48 will generate the control signal B51BG/ to the processor 100 awarding (block 388) the buses 122 and 62 to the processor 100. The processor 100 generates the memory write signal B51UPMEMWR/B51LOMEMWR/ (FIG. 6) to the memory units 50 and 52 and transfers (block 390) the data word to either the upper memory chip 150 (FIG. 4A and 4B) or the lower memory chip 152 (FIG. 4E) at an address outputted by the processor 100.

After a number of data words have been stored in the memory unit 50 and 52 (FIGS. 2A and 2B), the processor 48 will request (block 392) the DMA controller 78 (FIG. 2A) to transfer the stored data words over bus 32 to the data processor 30 by transmitting the control signal DREQ0/ through the latches unit 86 (FIG. 2A) to the controller 78. In response to receiving the control signal from the processor 48, the controller 78 will ask for control of the bus 32 from the processor 30 by raising the signal BMERQ to the processor 48. Once the controller has gained control of the bus 32 (block 394), the signals OWN/ and DACKO/ are transmitted (FIG. 6) to the board status unit 126. The processor 48 will have already loaded the starting address in the memory address counters 320-324 inclusive (FIG. 11A-11C inclusive) of the first data word to be transferred by the DMA controller 78. The processor 48 will have also enabled the DMA RAM address counter buffer 64 to generate addresses for accessing the memory units 50 and 52 enabling the controller 78 to transfer the remaining data words (block 396) over the buses 60 and 62 and through the data buffer 48 (FIG. 2A) to the processor 30 over the bus 32. After successfully completing the transfer of the block of data words from the interface adapter, the processor 48 generates an interrupt to the processor 30 (block 398) notifying the processor of the transfer, after which the processor 30 will transfer, new address data to the latches unit 38 (FIG. 2A).

While the principles of the invention have now been made clear in an illustrated embodiment, it will be obvious to those skilled in the art that many modifications of structure, arrangements, elements and components can be made which are particularly adapted for specific environments and operating requirements without departing from these principles. The appended claims are therefore intended to cover and embrace any such modification, within the limits only of the true spirit and scope of the invention.

What is claimed is:

1. In a data processing system comprising a first remote processor constructed to process data words of a first length and a second remote processor constructed to process data words of a second length, an interface means for interfacing said first and second remote processors comprising:

RAM means for storing words of a third length;

a DMA controller coupled to said first remote processor and said RAM means for controlling the transfer of a data word of said first length between the first remote processor and the DMA controller, for combining the words of said first length into words of said third length and for transferring a data word of said third length over a first bus means to the RAM means for storage therein when enabled, said DMA controller outputting a first control signal to the RAM means, when enabled, requesting access to the RAM means to transfer a data word of said third length to the RAM means;

transfer means coupled to said second remote processor over a second bus means and to said RAM means over a third bus means for combining the words of said third length stored in the RAM means into words of said second length and enabling the RAM means to output a data word of said second length to said second remote processor when enabled, said transfer means outputting, when enabled, a second control signal to said RAM means enabling the memory means to transfer a data word of said second length to said second remote processor, said first, second and third lengths are not equal;

a second control processor coupled to said second remote processor, said DMA controller and said transfer means for outputting an enabling signal to said first control processor and said transfer means enabling said DMA controller and said transfer means to transfer a data word of said third length from said DMA controller to said RAM means and to transfer a word of said second length from said RAM means to said second remote processor, said second control processor outputting a third control signal to said memory means enabling the RAM means to store a data word of said third length in said RAM means;

first storage means connected to said second remote processor over said second bus means and to said second control processor over said third bus means for storing transferred data requesting that a data word be transferred to said second remote processor from said first remote processor, said storage means generating an interrupt signal to said second control processor in response to the storing of the transferred data enabling said second control processor to read the transferred data whereby the second control processor will enable said DMA controller and said transfer means to transfer data words from said first remote processor to said second remote processor; and logic circuit means connected to said RAM means and said DMA controller and second control processor and said transfer means for receiving said first, second and third control signals for selecting one of said DMA controller and second control processor and said transfer means for access to the RAM means to perform a read or write operation on the RAM means in accordance with said third control signal whereby a data word is transferred from said first remote processor to said second remote processor through said RAM means under the control of said second control processor.

2. The interface means of claim 1 in which said RAM means comprise second and third storage means each storing words of said third length, said second and third control signals enabling the second and third storage means to simultaneously output a data word of said third length to said second remote processor.

3. The interface means of claim 2 in which said second control processor outputs a plurality of fifth control signals representing the starting address of the data words stored in said second and third storage means which is to be transferred to said second remote processor, said interface means further including counter means coupled to said second control processor and said second and third storage means for outputting a plurality of counts representing address signals to the second and third storage means in response to the generation of said fifth control signals enabling the second and third storage means to output data words of said second length to said second remote processor.

4. The interface means of claim 3 in which said second control processor outputs a plurality of sixth control signals to be used by the second control processor in accessing the second and third storage means, said interface means further including buffer means coupled to said second control processor and said second and third storage means for outputting said sixth control signals to said second and third storage means, said DMA controller outputting a seventh control signal to said buffer means upon accessing the second and third storage means and said transfer means outputting an eighth control signal to said buffer means upon accessing said second or third storage means whereby said buffer means is disabled from outputting said sixth control signals upon receiving either of said seventh or eighth control signals.

5. The interface means of claim 2 in which the word of said second length is twice the length of the word of said third length and the word of said third length is twice the length of the word of said first length.

6. In a data processing system comprising a first remote processor constructed to process data words of a first length and a second remote processor constructed to process data words of a second length, an apparatus for transferring data words from said first remote processor to said second remote processor comprising:

RAM means for storing words of a third length;

a DMA controller coupled to said first remote processor over a first data transfer bus and to said RAM means over a second data transfer bus for controlling the transfer of a data word of said first length between the first remote processor and the DMA controller, for combining the words of said first length into words of said third length and for transferring a data word of said third length to the RAM means over said second data transfer bus for storage therein when enabled, said DMA controller outputting a plurality of first control signals to the RAM means requesting access to the memory means to transfer the data word of said third length to the RAM means;

a data transfer member coupled to said second remote processor over a third data transfer bus and to said RAM means over a fourth data transfer bus for combining the words of said third length stored in said RAM means into words of said second length and for enabling the RAM means to output a data word of said second length to said second remote processor over said third data transfer bus when enabled, said transfer member outputting, when enabled, a plurality of second control signals to said RAM means enabling said RAM means to transfer a data word of said second length to said second remote processor said, second and third lengths are not equal;

a second control processor coupled to said second remote processor, said DMA controller and said transfer member for outputting enabling signals to said DMA controller and said transfer member enabling said DMA controller and said transfer member to transfer a data word of said third length from said DMA controller to said RAM means and to transfer a word of said second length from said RAM means to said second remote processor, said second control processor outputting a third control signal to said memory means enabling the RAM means to store a data word of said third length in said RAM means;

first storage latches connected to said second remote processor over said third data transfer bus and to said second control processor over a fifth data transfer bus for storing data words transferred from said second remote processor requesting that a data word be transferred to said second remote processor from said first remote processor, said first storage latches outputting a first interrupt signal over said fifth data transfer bus to said second control processor in response to the storing of the transferred data words from said second remote processor enabling said second control processor to read the transferred data whereby the second control processor will enable said DMA controller and said transfer member to transfer data words from said first remote processor to said second remote processor;

said second remote processor outputting a fourth control signal upon receiving a data word of said second length over said third data transfer bus; and logic means connected to said RAM means and said DMA controller and second control processor and said second remote processor for receiving said first, second, third and fourth control signals for enabling one of said DMA controller and second control processor and said transfer member to gain access to the RAM means to perform a read or write operation on the RAM means in accordance with said third control signal whereby an operation of the RAM means is generated under the control of said second control processor.

7. The apparatus of claim 6 in which said RAM means comprises first and second storage members each storing words of said third length, said second and third control signals enabling the second and third storage members to simultaneously output a data word of said third length to said second remote processor over said third data transfer bus.

8. The apparatus of claim 7 which further includes a buffer member and in which said second control processor outputs a plurality of fifth control signals representing the starting address of the data words stored in said first and second storage members which is to be transferred to said second remote processor, said apparatus further including counter means coupled to said second control processor and said buffer member for outputting a plurality of counts representing address signals to the buffer member in response to the generation of said fifth control signals enabling the buffer member to output the address signals to said first and second storage members whereby the first and second storage members are enabled to output a data word of said second length to said second remote processor over said third data transfer bus.

9. The apparatus of claim 8 in which said second control processor outputs a plurality of sixth control signals to said first and second storage members for controlling the operation of the first and second storage members, said apparatus further including a second buffer member coupled to said second control processor and said first and second storage members for outputting said sixth control signal to said first and second storage members, said DMA controller outputting a seventh control signal to said second buffer member upon gaining control of the first and second storage members and said transfer means outputting an eighth control signal to said second buffer member upon gaining control of said first and second storage members whereby said second buffer member is disabled from outputting said sixth control signals upon receiving either of said seventh or eighth control signals.

10. The apparatus of claim 9 which further includes a third storage member coupled to said DMA controller and second controller processor and said transfer member for storing said control signals and said interrupt signal enabling said second control processor to operate said DMA controller and said transfer member to transfer a data word from said first remote processor to said second remote processor in response to the generation of the interrupt signal.

11. The apparatus of claim 10 in which the words of said second length are twice the length of the words of said third length and the words of said third length are twice the length of the words of said first length.

* * * * *

UNITED STATES PATENT AND TRADEMARK OFFICE
CERTIFICATE OF CORRECTION

PATENT NO. : 4,949,246

DATED : August 14, 1990

INVENTOR(S) : Robert R. O'Dell et al.

It is certified that error appears in the above-identified patent and that said Letters Patent is hereby corrected as shown below:

Cover Page of Patent, [54], insert the word --INTERFACE-- before the word "ADAPTER" in the title.

Column 13, line 13, delete the word "memory" and substitute --RAM--.

Column 14, line 31, delete the word "memory" and substitute --RAM--.

Column 14, line 46, insert the word --first,-- before the word "second".

Signed and Sealed this

Tenth Day of March, 1992

*Attest:*

HARRY F. MANBECK, JR.

*Attesting Officer*  *Commissioner of Patents and Trademarks*